(12) United States Patent
Miyake et al.

(10) Patent No.: US 6,350,946 B1
(45) Date of Patent: Feb. 26, 2002

(54) PHOTOELECTRIC CONVERSION DEVICE AND PHOTOELECTRIC CELL

(75) Inventors: Kiyoteru Miyake, Kanagawa; Tadao Sugimoto, Miyagi, both of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/659,607

(22) Filed: Sep. 11, 2000

(30) Foreign Application Priority Data

Sep. 10, 1999 (JP) .......................................... 11-257424

(51) Int. Cl.$^7$ ..................... H01L 31/0264; H01L 31/04; H01L 31/0256
(52) U.S. Cl. ................... 136/252; 136/263; 136/258; 136/256; 429/111; 257/49; 257/431; 257/43; 423/598; 423/610; 423/592; 423/608; 423/622; 438/85; 438/82; 427/74
(58) Field of Search ................. 136/263, 252, 136/258 PC, 256; 429/111; 257/49, 431, 43; 427/74; 423/598, 610, 592, 608, 622; 438/85, 82

(56) References Cited

U.S. PATENT DOCUMENTS

| | | | | |
|---|---|---|---|---|
| 5,362,514 A | * | 11/1994 | Flatz et al. | 427/74 |
| 5,728,487 A | * | 3/1998 | Gratzel et al. | 429/111 |
| 5,840,111 A | * | 11/1998 | Wiederhoft et al. | 106/436 |
| 5,885,368 A | * | 3/1999 | Lupo et al. | 136/263 |

FOREIGN PATENT DOCUMENTS

| | | |
|---|---|---|
| EP | 887817 A2 * | 12/1998 |
| EP | 901175 A2 * | 3/1999 |

OTHER PUBLICATIONS

Sugimoto et al, "Synthesis of Uniform Spindle–type Titania Particles by the Gel–Sol Method," Journal of Colloid and Interface Science, vol. 193, pp. 140–143, (1997).*
J. Am. Chem. Soc. 1988, Very Efficient Visible light Energy Harvesting and Conversion by Spectral Sensitization of High Surface Area Polycrystalline Titanium Dioxide Films, 110, pp. 1216–1220.
J. Phys. Chem. 1990, Vectorial Electron Injection into Transparent Semiconductor Membranes and Electric Field Effects on the Dynamics of Light–Induced Charge Separation, 94, pp. 8720–8726.
J. Am. Ceramic Soc. 1997, Nanocrystalline Titanium Oxide Electrodes for Photovoltaic Applications, 80, pp. 3157–3171.
J. Colloid Interface Sci., 1997, Synthesis of Uniform Spindle–Type Titana Particles by the Gel–Sol Method, 190, pp. 140–143.

* cited by examiner

*Primary Examiner*—Alan Diamond
(74) *Attorney, Agent, or Firm*—Sughrue Mion, PLLC

(57) ABSTRACT

A photoelectric conversion device having a photosensitive layer comprising semiconductor particles is disclosed, in which the semiconductor particles are obtained from a metal hydroxide gel or a precursor thereof present in a hydrophilic solvent. Also disclosed in a photoelectric cell including the photoelectric conversion device.

15 Claims, 4 Drawing Sheets

PHOTOELECTRIC CONVERSION DEVICE AND PHOTOELECTRIC CELL

FIELD OF THE INVENTION

This invention relates to a photoelectric conversion device and a photoelectric cell comprising the same. More particularly, it relates to a photoelectric conversion device using dye-sensitized semiconductor particles and a photoelectric cell comprising the device.

BACKGROUND OF THE INVENTION

In the field of photovoltaic power generation, the focus of research and development and practical application has been chiefly put on monocrystalline silicon solar cells, polycrystalline silicon solar cells, amorphous silicon solar cells, and compound solar cells using cadmium telluride, copper indium selenide, etc. It is required for spread of solar cells to overcome such difficulties as a high production cost, a short supply of raw materials, and a long energy payback time. Although many solar cells using organic materials have been proposed aiming at an increase of working area and a reduction of cost, they have a low conversion efficiency and poor durability.

Under these circumstances, Nature, vol. 353, pp. 737–740 (1991) and U.S. Pat. No. 4,927,721 disclose a photoelectric conversion device using dye-sensitized semiconductor particles, a solar cell comprising the device, and materials and techniques for producing them. The proposed cell is a wet type solar cell comprising, as a work electrode, a porous thin film of titanium dioxide spectrally sensitized by a ruthenium complex. A primary advantage of this system is that such an inexpensive oxide semiconductor as titanium dioxide can be used without being highly purified so that a photoelectric conversion device can be supplied at a competitive price. A secondary advantage is that the sensitizing dye used shows a broad absorption spectrum so that substantially the whole range of visible light can be utilized.

For practical use as a solar cell, it is required for the porous thin film of semiconductor particles such as titanium dioxide to have a roughness factor of about 1000 so as to secure a large specific surface area. For this purpose, fine pores on the order of nanometer (a nano-porous structure) should be made. Methods for forming a porous thin film of titanium dioxide are described, e.g., in Masao Kaneko (ed.), *Hikari Energy Henkan -Kiso to Ohyo-*, ch. 3, § 2, IPC K.K.

In order to form a nano-porous thin film, wet processes comprising applying a dispersion or a colloidal solution of semiconductor particles onto an electrically conductive substrate are preferred to dry processes, such as vacuum deposition, which are unsuited to large-scale production and costly. A dispersion or a colloidal solution of the semiconductor particles to be used in the wet processes can be prepared by a sol-gel process, a method comprising grinding a semiconductor in a mortar, or a method comprising wet grinding a semiconductor in a mill. A synthetic semiconductor as precipitated in a solvent in the form of fine particles can also be used as such. However, a sol-gel process needs high temperature for converting a metal hydroxide compound produced by hydrolysis into an oxide. In addition, a conventional sol-gel process has difficulty in obtaining monodisperse particles, meeting difficulty in forming a uniform nano-porous film. Further, the particles ground in a mortar or dispersively ground in a mill are liable to agglomerate, making it difficult to establish the conditions for obtaining a nano-porous film.

The difficulty in forming a nano-porous semiconductor layer suitable for use in a photoelectric conversion device and a photoelectric cell has been a bar to improvement in short circuit current and photoelectric conversion.

SUMMARY OF THE INVENTION

An object of the present invention is to provide a dye-sensitized photoelectric conversion device and a photoelectric cell having a high short circuit current and a high photoelectric conversion.

Other objects and effects of the present invention will become more apparent from the following description.

The above objects of the invention have been achieved by providing the following photoelectric conversion devices and photoelectric cell.

(1) A photoelectric conversion device having a photosensitive layer comprising semiconductor particles obtained from a metal hydroxide gel or a precursor thereof present in a hydrophilic solvent.

(2) The photoelectric conversion device according to the above item (1), wherein said metal hydroxide gel or said precursor is formed by hydrolysis of a stable metal complex.

(3) The photoelectric conversion device according to the above item (2), wherein said metal complex has a ligand selected from the group consisting of compounds having a hydroxyl group, a carbonyl group, an ester group or a carboxyl group and amine compounds.

(4) The photoelectric conversion device according to the above item (2) or (3), wherein said metal complex has a multidentate ligand.

(5) The photoelectric conversion device according to any one of the above items (1) to (4), wherein said semiconductor is a metal chalcogenide.

(6) The photoelectric conversion device according to any one of the above items (1) to (5), wherein said semiconductor comprises at least one chalcogenide compound of a metal selected from the group consisting of titanium, tin, zinc, iron, tungsten, zirconium, hafnium, strontium, indium, cerium, yttrium, lanthanum, vanadium, niobium and tantalum.

(7) The photoelectric conversion device according to any one of the above items (1) to (6), wherein said semiconductor is a metal oxide.

(8) The photoelectric conversion device according to any one of the above items (1) to (7), wherein said semiconductor is titanium dioxide.

(9) The photoelectric conversion device according to any one of the above items (1) to (8), wherein said semiconductor particles have a coefficient of particle size variation of 30% or less.

(10) The photoelectric conversion device according to any one of the above items (1) to (8), wherein said semiconductor particles have a coefficient of particle size variation of 20% or less.

(11) The photoelectric conversion device according to any one of the above items (1) to (10), wherein said semiconductor particles are sensitized with a dye.

(12) The photoelectric conversion device according to the above item (11), wherein the dye is at least one of a ruthenium complex dye and a methine dye.

(13) The photoelectric conversion device according to any one of the above items (1) to (12), further having a charge transporting layer comprising a molten salt electrolyte.

(14) The photoelectric conversion device according to any one of the above items (1) to (12), further having a charge transporting layer comprising a hole-transporting material.

(15) A photoelectric cell comprising a photoelectric conversion device according to any one of the above items (1) to (14).

DETAILED DESCRIPTION OF THE INVENTION

Figure 1:
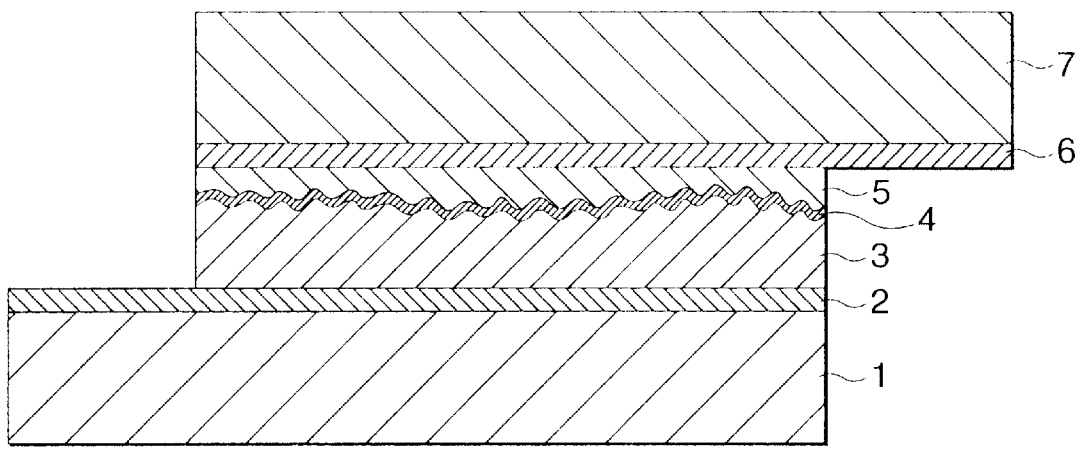
FIG. 1 is a schematic cross section of the photoelectric cell prepared in Example 1.

The photoelectric conversion device according to the invention comprises an electrically conductive substrate, a semiconductor layer sensitized with a dye, etc. (photosensitive layer) provided on the conductive substrate, a charge transporting layer, and a counter electrode. The photoelectric cell according to the invention is a practical application of the photoelectric conversion device for use as a battery working in an external circuit.

The photosensitive layer is designed to fit for the end use and can have either a single layer structure or a multilayer structure. Light having entered the photosensitive layer excites the dye, etc. The excited dye, etc. have high energy electrons, which are handed over from the dye, etc. to the conduction band of the semiconductor particles and diffused to reach the conductive substrate. Oxidized molecules of the dye, etc., which result from the electron migration are regenerated by the electrons supplied from the counter electrode and the charge transporting layer. The semiconductor layer acts a negative electrode of the cell. The components of the individual layers constituting the device may be diffused and mixed mutually at their boundaries, for example, the boundary between the conductive layer (hereinafter described) of the conductive substrate and the photosensitive layer, the boundary between the photosensitive layer and the charge transporting layer, and the boundary between the charge transporting layer and the counter electrode.

The present invention is characterized by an improvement added to the semiconductor layer. That is, the semiconductor layer used in the invention is formed of semiconductor particles obtained from a metal hydroxide gel or a precursor thereof.

The semiconductor which can be used in the invention includes compound semiconductors typically exemplified by metal chalcogenides (e.g., oxides, sulfides, and selenides) and perovskite semiconductors. The metal chalcogenides preferably include an oxide of titanium, tin, zinc, iron, tungsten, zirconium, hafnium, strontium, indium, cerium, yttrium, lanthanum, vanadium, niobium or tantalum; a sulfide of cadmium, zinc, lead, silver, antimony or bismuth; a selenide of cadmium or lead; and cadmium telluride. Other compound semiconductors include a phosphide of zinc, gallium, indium or cadmium, gallium arsenide, copper indium selenide, and copper indium sulfide. The perovskite semiconductors include strontium titanate, calcium titanate, sodium titanate, barium titanate, and potassium niobate.

Preferred semiconductors for use in the invention include $TiO_2$, $SnO_2$, $Fe_2O_3$, $WO_3$, $ZnO$, $Nb_2O_5$, $CdS$, $ZnS$, $PbS$, $Bi_2S_3$, $CdSe$, $CdTe$, $CuInS_2$, and $CuInSe_2$. Still preferred are $TiO_2$, $ZnO$, $SnO_2$, $Fe_2O_3$, $WO_3$, $Nb2O_5$, $CdS$, $PbS$, $CdSe$, $InP$, $CuInS_2$, and $CuInSe_2$. $TiO_2$, $WO_3$, and $Nb_2O_5$ are particularly preferred. $TiO_2$ is the most preferred. $TiO_2$ may be any of rutile, anatase and brookite, with anatase being preferred.

The particles of the metal chalcogenide or perovskite compound are prepared by dehydration of a metal hydroxide gel or a precursor thereof which is formed in a hydrophilic solvent. The metal hydroxide gel or a precursor thereof is preferably formed by hydrolysis of a stable metal complex. It can also be formed in a hydrophilic solvent by hydrolysis of a metal chloride.

While a metal hydroxide can generally be synthesized by hydrolysis of a metal compound, too fast hydrolysis results in non-uniform formation of the metal hydroxide only to give polydisperse metal chalcogenide or perovskite-type particles. For example, on adding titanium tetraisopropoxide or titanium tetrachloride to water, hydrolysis reaction proceeds instantaneously to produce lumps of titanium hydroxide of various sizes, from which monodisperse titanium oxide particles cannot be obtained without difficulty.

The inventors have found it important for obtaining monodisperse particles to control the rate of hydrolysis in the formation of a metal hydroxide. They have succeeded in forming a uniform metal hydroxide gel or a precursor thereof through pH adjustment of the hydrolysis system and/or selection of the ligand of a starting metal complex, from which monodisperse particles of the corresponding metal chalcogenide or perovskite structure can be obtained. They have ascertained that the monodisperse semiconductor particles thus obtained, when used as a photosensitive layer, provide a photoelectric conversion device having an improved short circuit current and an improved photoelectric conversion.

In a highly preferred embodiment of the invention, the metal hydroxide gel or a precursor thereof is prepared by forming a stable metal complex in a hydrophilic solvent and hydrolyzing it. The term "stable complex" as used herein means such a complex that is slow in reacting with water at room temperature, requiring 10 minutes or more to be 50% converted into a hydroxide at 25° C. The "stable complex" is preferably such that it requires 1 hour or longer, still preferably 1 day or even longer, to be 50% converted into a hydroxide at 25° C. It is preferred that such a stable complex be once formed in a hydrophilic solvent and then subjected to hydrolysis under control by adjusting the pH of the solution or by heating.

The hydrophilic solvent which can be used in the invention includes water, hydrophilic organic solvents, and mixtures thereof. Water, alcohols (e.g., methanol, ethanol, propanol, and isopropyl alcohol), alkanolamines (e.g., triethanolamine), and mixtures thereof are preferred.

The metal hydroxide produced by the hydrolysis is made into gel having a three-dimensional network whereby the particles grow apart from each other without agglomerating. Besides, metal ions are supplied from the metal hydroxide gel to let the particles grow into monodisperse particles.

The methods forming the semiconductor particles according to the invention include an embodiment in which a metal complex is mixed with water, and the mixture is aged (i.e., maintained under certain conditions) in two divided stages; in the first stage of aging to form a gel of a hydroxide, in the second stage to convert the hydroxide to, for instance, a metal oxide through dehydration. According to Tadao Sugimoto, *Materia*, vol. 35, No. 9, pp. 1012–1018, "Shin goseiho gel-sol-ho niyoru tanbunsan ryushino goseito size keitai seigyo" (1996), for example, titanium dioxide particles can be synthesized by using a triethanolamine adduct as a complex. In this case, anatase particles of nanometer size can be prepared by carrying out the first stage aging at about 100° C. for 24 hours and the second stage aging at 140° C. for 72 hours. The system will have formed a gel by the end of the first stage aging or, at the latest, in the initial stage of the second stage aging, while it is desirable that the gel has been formed by the end of the first stage aging. Where a gel is formed in the initial stage of heating in the second stage aging, the system at the end of the first stage aging (before gelation) is designated "a gel precursor". The gel precursor is characterized in that it is not gel at room temperature but turns into gel when exposed to a low temperature, e.g., 5° C. or a high temperature, e.g., 80° C.

The ligand which constitutes the metal complex preferably includes compounds containing an oxygen atom or a nitrogen atom capable of coordinating, e.g., compounds having a hydroxyl group, a carbonyl group, an ester group or a carboxyl group and amine compounds. The ligand may be unidentate, bidentate or tridentate. Multidentate ligands are preferred for forming a stable complex. Polynuclear ligand compounds are also employable.

The compounds having a hydroxyl group include alkanolamine compounds, polyol compounds, glycol compounds, hydroxycarboxylic aids, and polyhydric phenols. The compounds having a carbonyl group include β-diketone compounds, β-keto ester compounds, oxime compounds, dioxime compounds, and urea compounds. The compounds having an ester group include β-keto ester compounds. The compounds having a carboxyl group include polycarboxylic aids, hydroxycarboxylic acids, amino acids, and nitrogen-containing carboxylic acids. The amine compounds include alkanolamines, diamines, and urea compounds. Preferred of these ligand compounds are alkanolamine compounds, glycol compounds, hydroxycarboxylic acids, β-diketone compounds, β-keto ester compounds, and diamine compounds. Examples of the preferred compounds are diethanolamine, triethanolamine, trimethylolamine, pentaerythritol, trimethylolethane, trimethylolpropane, ethylenediamine, ethylenediaminetetraacetic acid, ethylenediaminebisacetylacetonate, acetylacetone, urea, succinic acid, phthalic acid, citric acid, tartaric acid, malic acid, lactic acid, glycolic acid, methyl acetoacetate, ethyl acetoacetate, ethylene glycol, hexylene glycol, dimethyl glyoxime, and picolic acid. Triethanolamine and ethylenediaminetetraacetic acid are particularly preferred.

The molar ratio of the metal ion to the ligand preferably ranges from 0.5 to 5, particularly 1 to 4.

The molar concentration of the stable complex is preferably in the range of from 0.1 to 10 mol/l, particularly from 0.5 to 5 mol/l.

The conditions for forming a gel or a precursor thereof include the aging treatment (the first stage aging) at 60 to 180° C. and pH adjustment with an acid or a base. The aging temperature is preferably 80 to 120° C., still preferably 90 to 110° C. The aging time at, e.g., 100° C. is preferably 8 to 36 hours, still preferably 12 to 24 hours.

The metal hydroxide in the form of gel or a precursor thereof can be converted to a metal chalcogenide, e.g., an oxide, a sulfide, a selenide or telluride, as follows.

Conversion to a metal oxide is preferably carried out by dehydration under heat. The second stage aging for hydration should be at a higher temperature than the aging for gelation. A difference of at least 10° C. is necessary.

Conversion to a metal sulfide is preferably carried out by adding to the metal hydroxide a labile sulfur compound, such as thioacetamide, thiourea, thiosulfates, cystine, rhodanine compounds, allyl isothiacyanate, mercapto compounds, thiosulfonic acid salts, and disulfides.

Conversion to a metal selenide is preferably effected by adding to the metal hydroxide a labile selenium compound, such as selenourea, colloidal metallic selenium, selenoketones, selenoamides, aliphatic isoselenocyanates, selenocarboxylic acids and esters thereof, selenophosphates, and selenides.

Conversion to a metal telluride is preferably performed by adding to the metal hydroxide such a labile tellurium compound as described in *J. Chem. Soc. Chem. Commun.*, p. 653 (1980), ibid, p. 1102 (1979), ibid, p. 645 (1979), *J. Chem. Soc. Perkin Trans.*, vol.1, p. 2191 (1980), and S. Patai, *The Chemistry of Organic Selenium and Tellurium Compounds*, vol. 1 (1986) and vol. 2 (1987).

In the step of converting the metal hydroxide gel to a metal chalcogenide, the system can contain a natural or artificial binder, such as gelatin, polyethylene glycol, carboxymethyl cellulose, hexylethyl cellulose, polyvinyl alcohol, polyvinylpyrrolidone, starch, carrageenan, and gum arabic.

The semiconductor particles may be amorphous, single crystalline or polycrystalline. Microfine particles on the order of nanometer to micron meter are preferred. The particle size can be expressed in terms of a projected area diameter (the diameter of a circle having the same area of the projected area of the particle), which is obtained, for precision, from the projected area of a micrograph under a transmission electron microscope. Where the particles are crystals, an average primary particle size can be obtained, for convenience, from the line width of X-ray diffraction in accordance with the Scherrer's formula. The particulate semiconductors preferably have an average primary particle size of 5 to 200 nm, particularly 8 to 100 nm, with a coefficient of variation (a ratio of a standard deviation of the particle size to a mean particle size, usually represented by percentages) of 50% or less, particularly 30% or less, especially 20% or less. The semiconductor particles in a dispersed state (secondary particles) preferably have an average particle size of 0.01 to 100 μm.

Semiconductor particles of two or more kinds different in size distribution can be used as a mixture. In this case, the average size of smaller particles is preferably 10 nm or less. For the purpose of scattering incident light to improve the rate of capturing light, large semiconductor particles about 300 nm or greater in size may be used in combination.

The particulate semiconductor is preferably prepared by the aforementioned gel-sol process described in *Materia*, vol. 35, No. 9, pp. 1012–1018, "Shin goseiho gel-sol-ho niyoru tanbunsan ryushino goseito size keitai seigyo" (1996) supra.

The crystal grain size can be controlled by the temperature, the time, the pH, and the ratio of a known amount of seed crystals to the hydroxide in the grain growth system. The pH preferred for obtaining titanium dioxide particles having a projected area diameter of 10 to 30 nm is 7 or higher.

The shape of the particles is controllable by pH adjustment, presence of an ammonium ion or an acetate ion, and the like. For example, rod-like anatase particles having a (100) plane and a (110) plane as an outer surface can be prepared by using ammonia. It is preferred for rod-like particles to have an aspect ratio (length to breadth ratio) of 3 or greater, particularly 10 or greater. Plate-like particles preferably have an aspect ratio (diameter to thickness ratio) of 3 or greater, particularly 10 or greater. Having a higher aspect ratio than spherical particles of the same volume, rod-like and plate-like particles provide a greater specific surface area to adsorb a larger amount of a dye, which is advantageous for increasing the short circuit current.

After grain formation, unnecessary reaction products and unreacted substances present in the liquid phase can be removed by centrifugation, spontaneous sedimentation or other means, or the system can be concentrated.

The electrically conductive support includes a support made of a conductive material, such as metal, and a support comprising a nonconductive substrate made of glass or plastics having on the surface thereof a conductive layer. Preferred conductors for use in the latter type of conductive supports include metals (e.g., platinum, gold, silver, copper, aluminum, rhodium, and indium), carbon, and electrically conductive metal oxides (e.g., indium tin oxide and fluorine-doped tin oxide). The conductive layer preferably has a thickness of about 0.02 to 10 $\mu$m.

The conductive support preferably has as low a surface resistance as possible. A desirable surface resistance is 100 $\Omega$/square or smaller, particularly 40 $\Omega$/square or smaller. While not limiting, the practical minimal surface resistance is about 0.1 2 $\Omega$/square.

It is preferred that the conductive support be substantially transparent to light. The term "substantially transparent" is intended to mean that the light transmission is at least 10%, preferably 50% or more, still preferably 70% or more. A transparent substrate such as glass or plastic, having a conductive metal oxide layer coated thereon is preferred as a transparent support. Of the above conductive supports particularly preferred is conductive glass support obtained by depositing a conductive layer comprising fluorine-doped tin dioxide on a transparent substrate made of inexpensive soda-lime float glass. For the manufacture of inexpensive flexible photoelectric conversion devices or solar cells, a support comprising a transparent polymer film having the above-described conductive layer is suitable. Useful transparent polymers include tetraacetylcellulose (TAC), polyethylene terephthalate (PET), polyethylene naphthalate (PEN), syndiotactic polystyrene (SPS), polyphenylene sulfide (PPS), polycarbonate (PC), polyacrylate (PAr), polysulfone (PSF), polyester sulfone (PES), polyether-imide (PEI), cyclic polyolefins, and brominated phenoxy resins. The coated amount of the conductive metal oxide is preferably 0.01 to 100 g per m$^2$ of a glass or plastic substrate. The transparent conductive support is preferably used in such a manner that incident light enters from the support (substrate) side.

In order to decrease the resistance of the transparent conductive support, it is preferred to use a metal lead, which is preferably made of aluminum, copper, silver, gold, platinum, nickel, etc., with an aluminum lead or a silver lead being particularly preferred. The metal lead is preferably formed on the transparent substrate by vacuum evaporation, sputtering or a like deposition technique, on which a transparent conductive layer of fluorine-doped tin oxide or ITO is provided. It is also preferred that the transparent conductive layer be provided on the transparent substrate, on which the metal lead can be formed. Reduction in incident light quantity due to the metal leads is usually 1 to 10%, preferably 1 to 5%.

The semiconductor particles are applied to the conductive support by, for example, a method comprising coating the conductive support with a dispersion or colloidal solution of the semiconductor particles. Film formation in a wet system is relatively advantageous, taking into consideration suitability to large-scale production of a photoelectric conversion device, controllability of liquid physical properties, and adaptability to various supports. Film formation in a wet system is typically carried out by coating or printing.

Useful dispersing media include water and various organic solvents, such as methanol, ethanol, isopropyl alcohol, dichloromethane, acetone, acetonitrile, and ethyl acetate. In preparing a dispersion, a polymer (e.g., polyethylene glycol), a surface active agent, an acid, a chelating agent, and the like may be added as a dispersant if desired. In particular, use of polyethylene glycol with an appropriately controlled molecular weight is effective for forming a hardly peelable film or for modifying the viscosity of the dispersion.

Wet coating techniques include application methods such as roll coating and dip coating, metering methods such as air knife coating or blade coating, and application methods combined with metering such as wire bar coating (JP-B-58-4589), slide hopper coating (U.S. Pat. Nos. 2,681,294, 2,761,419, and 2,761,791), extrusion coating, and curtain coating. General-purpose spin coating or spraying techniques are also suitable. Wet printing techniques include letterpress printing, offset printing, gravure printing, intaglio printing, rubber plate printing, and screen printing. A suitable film formation system is chosen from among the above-enumerated techniques in accordance with the liquid viscosity and a desired wet thickness.

The liquid viscosity is largely dependent on the kind and the dispersibility of the semiconductor particles, the solvent, and additives such as a surface active agent and a binder. In order to form a uniform film, extrusion coating or casting is fit for a high viscous liquid (e.g., 0.01 to 500 Poise), while slide hopper coating, wire bar coating or spin coating is suited for a low viscous liquid (e.g., 0.1 Poise or lower) . A low viscous liquid could be applied by extrusion coating where it is to be applied to some coating weight. Screen printing, as is often used in applying a high-viscosity paste of semiconductor particles, can be used as well. Thus, a suitable wet process for film formation can be selected in accordance with such parameters as the liquid viscosity, the coating weight, the type of the support, the speed of application, and so forth.

The semiconductor layer does not need to be a single layer. Two or more layers different in particle size of semiconductor particles, in kind of semiconductors or in composition as for the binder or additives can be provided. In case where single operation of application is insufficient for giving a desired thickness, multilayer coating is effective. Extrusion coating or slide hopper coating is suitable for multilayer coating. Multilayer coating can be carried out simultaneously or by successively repeating the coating operation several times or more than ten times. Screen printing is also preferably applicable to successive multilayer coating.

In general, as the thickness of the particulate semiconductor layer increases, the amount of the dye held per unit projected area increases to show an increased rate of capturing light, but the distance of diffusion of generated electrons also increases, which results in an increased loss due to re-coupling of charges. Accordingly, there is a favorable thickness range for the particulate semiconductor layer, which is typically from 0.1 to 100 $\mu$m. Where the device is used as a photoelectric cell, a favorable thickness is 1 to 30 $\mu$m, particularly 2 to 25 $\mu$m. The coating weight of the semiconductor particles is preferably 0.5 to 400 g, still preferably 5 to 100 g per m$^2$ of the support.

It is preferred that the semiconductor particles applied to the support be heated to bring them into electronic contact with each other, to improve film strength, and to improve adhesion to the support. A preferred heating temperature is 40° C. or higher and lower than 700° C. particularly from 100 to 600° C. The heating time is usually from about 10 minutes to about 10 hours. Where a support having a low melting point or a low softening point, such as a polymer film, is used, high-temperature treatment which would deteriorate the support should be avoided. For the economical consideration, too, the heating temperature is preferably as low as possible. The heating temperature could be lowered by using the above-mentioned small semiconductor particles having a diameter of up to 5 nm in combination or by conducting the heat treatment in the presence of a mineral acid.

For the purpose of increasing the surface area of the semiconductor particles and of increasing the purity in the vicinities of the semiconductor particles thereby to improve electron injection efficiency from the dye to the semiconductor particles, the heat-treated particulate semiconductor layer can be subjected to chemical plating with a titanium tetrachloride aqueous solution or electrochemical plating with a titanium trichloride aqueous solution.

It is preferable for the semiconductor particles to have a large surface area so that they may adsorb as large an amount of a dye as possible. The surface area of the semiconductor particles in the state applied to the conductive support is preferably 10 times or more, still preferably 100 times or more, the projected area. The practical upper limit of the surface area is, but is not limited to, about 1000 times the projected area.

The dye which can be used in the present invention includes metal complex dyes and methine dyes. Two or more kinds of dyes can be used in combination so as to broaden the wavelength region of photoelectric conversion and to increase the conversion efficiency. The dyes to be combined and their ratio can be selected in conformity with the wavelength region and the intensity distribution of a light source to be used. It is preferred for the dyes to have an appropriate interlocking group for linking to the surface of the semiconductor particles. Preferred interlocking groups include —COOH, —SO$_3$H, a cyano group, —P(O)(OH)$_2$, —OP(O)(OH)$_2$, and chelating groups having pi conductivity, such as oxime, dioxime, hydroxyquinoline, salicylate and α-keto-enolate groups. Particularly preferred of them are —COOH, —P(O)(OH)$_{21}$ and —OP(O)(OH)$_2$. The interlocking group may be in the form of a salt with an alkali metal, etc. or an intramolecular salt. Where the methine chain of a polymethine dye has an acidic group as in the case where the methine chain forms a squarylium ring or a croconium ring, that moiety can serve as a interlocking group.

The metal complex dyes preferably include ruthenium complex dyes. Those represented by formula (I) are still preferred.

$$(A_1)_p RuB_a B_b B_c \qquad (I)$$

wherein $A_1$ represents a ligand selected from Cl, SCN, H$_2$O, Br, I, CN, NCO and SeCN; p represents an integer of 0 to 2, preferably 2; and $B_a$, $B_b$, and $B_c$ each represent an organic ligand selected from B-1 to B-8 shown below.

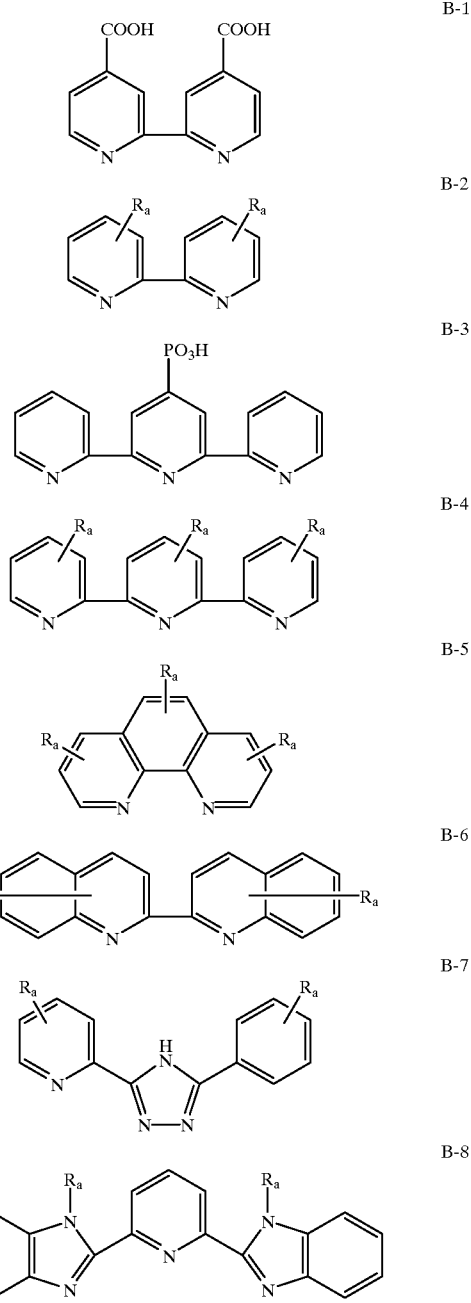

wherein $R_a$ represents a hydrogen atom, halogen atom, a substituted or unsubstituted alkyl group having 1 to 12 carbon atoms, a substituted or unsubstituted aralkyl group having 7 to 12 carbon atoms, or a substituted or unsubstituted aryl group having 6 to 12 carbon atoms. The alkyl group and the alkyl moiety of the aralkyl group may be either straight or branched, and the aryl group and the aryl moiety of the aralkyl group may be either monocyclic or polycyclic (condensed rings or independent rings).

Examples of useful ruthenium complex dyes are given in U.S. Pat. Nos. 4,927,721, 4,684,537, 5,084,365, 5,350,644, 5,463,057, and 5,525,440, and JP-A-7-249790. Specific examples of preferred ruthenium complex dyes represented by formula (I) are tabulated below.
| No. | $A_1$ | p | $B_a$ | $B_b$ | $B_c$ | $R_a$ |
|---|---|---|---|---|---|---|
| R-1 | SCN | 2 | B-1 | B-1 | — | — |
| R-2 | CN | 2 | B-1 | B-1 | — | — |
| R-3 | Cl | 2 | B-1 | B-1 | — | — |
| R-4 | Br | 2 | B-1 | B-1 | — | — |
| R-5 | I | 2 | B-1 | B-1 | — | — |
| R-6 | SCN | 2 | B-1 | B-2 | — | H |
| R-7 | SCN | 1 | B-1 | B-3 | — | — |
| R-8 | Cl | 1 | B-1 | B-4 | — | H |
| R-9 | I | 2 | B-1 | B-5 | — | H |
| R-10 | SCN | 2 | B-1 | B-6 | — | H |
| R-11 | CN | 2 | B-1 | B-7 | — | H |
| R-12 | Cl | 1 | B-1 | B-8 | — | H |
| R-13 | — | 0 | B-1 | B-1 | B-1 | — |
Specific examples of other preferred metal complex dyes are shown below.
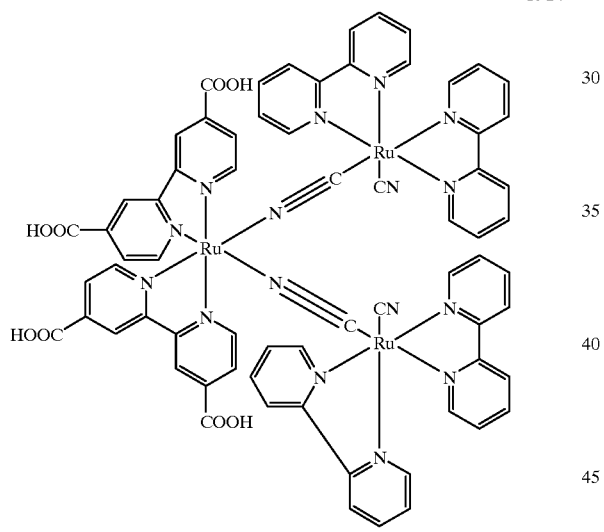
R-14
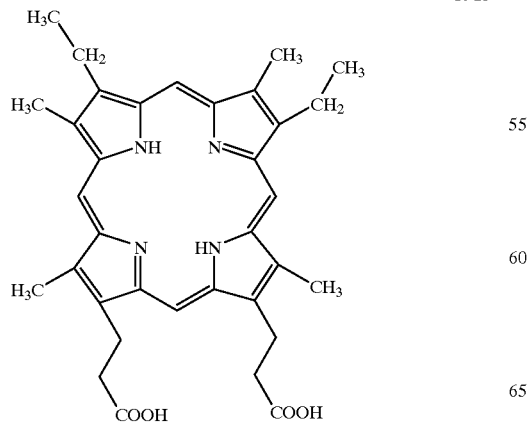
R-15
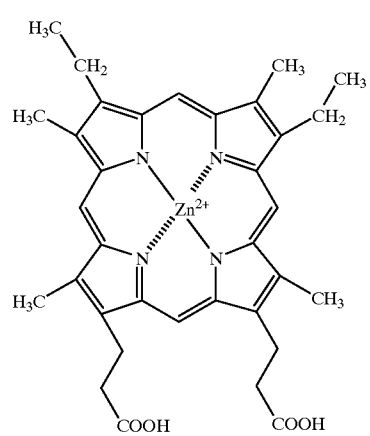
R-16
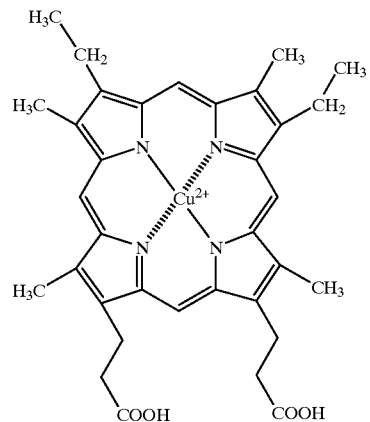
R-17
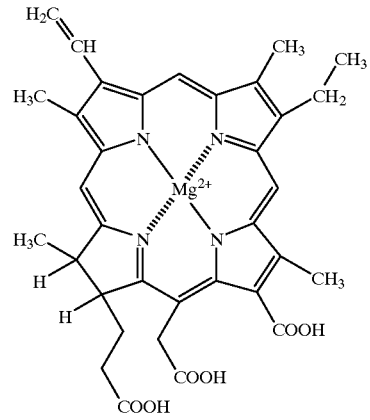
R-18

-continued

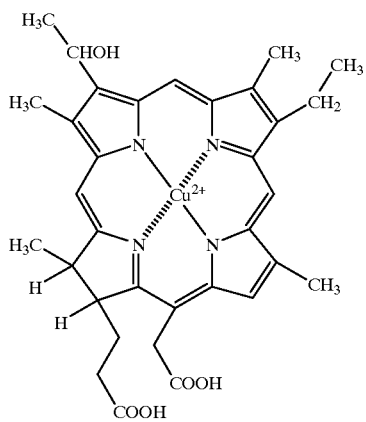
R-19

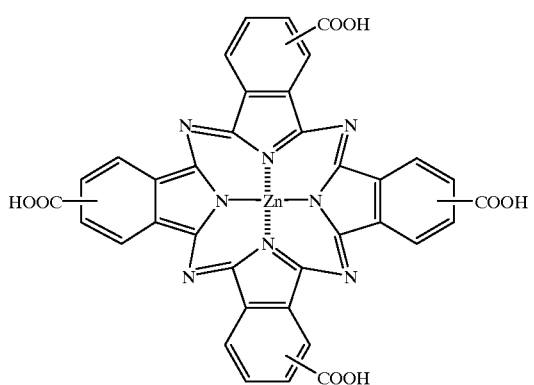
R-20

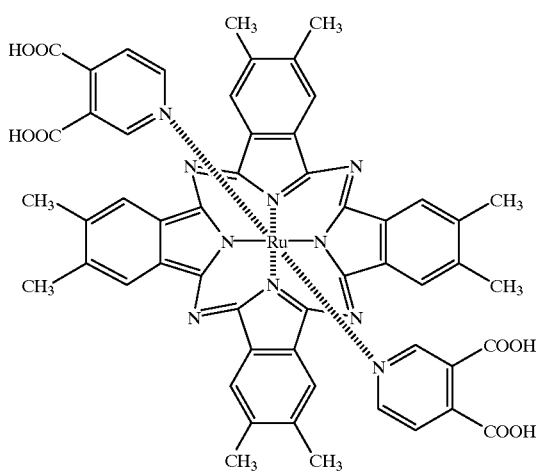
R-21

The methine dyes which can be used preferably include those represented by formulae (II), (III), (IV) and (V) shown below.

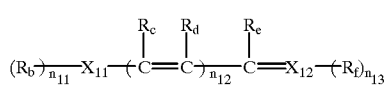
(II)

wherein $R_b$ and $R_f$ each represent a hydrogen atom, an alkyl group, an aryl group or a heterocyclic group; $R_c$, $R_d$, and $R_e$ each represent a hydrogen atom or a substituent; $R_b$, $R_c$, $R_d$, $R_e$, and $R_f$ may appropriately be taken together to form a ring; $X_{11}$ and $X_{12}$ each represent a nitrogen atom, an oxygen atom, a sulfur atom, a selenium atom or a tellurium atom; n11 and n13 each represent an integer of 0 to 2; and n12 represents an integer of 1 to 6.

The compound of formula (II) may have a counter ion in agreement with the charge quantity of the whole molecule. In formula (II), the alkyl, aryl, and heterocyclic groups may have a substituent; the alkyl group may be straight or branched; the aryl and heterocyclic groups may be monocyclic or polycyclic (condensed rings or independent rings); and the ring formed of $R_b$, $R_c$, $R_{d, Re}$, and $R_f$ may have a substituent and may be monocyclic or polycyclic.

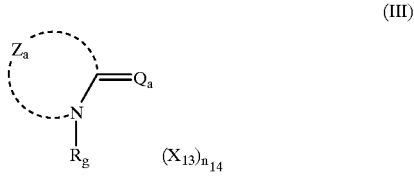
(III)

wherein $Z_a$ represents a non-metallic atom group necessary to form a nitrogen-containing heterocyclic ring; $R_g$ represents an alkyl group or an aryl group; $Q_a$ represents a mono- or polymethine group necessary to complete a (poly)methine dye; $X_{13}$ represents a counter ion in balance; and n14 represents a number of from 0 up to 10 that is necessary to neutralize the charges of the molecule.

In formula (III), the nitrogen-containing heterocyclic ring formed by $Z_a$ may have a substitutent and may be a single ring or a condensed ring; the alkyl or aryl groups may have a substituent; the alkyl group may be straight or branched; and the aryl group may be monocyclic or polycyclic (condensed rings or independent rings).

Of the dyes represented by formula (III) preferred are those represented by formulae (III-a) through (III-d):

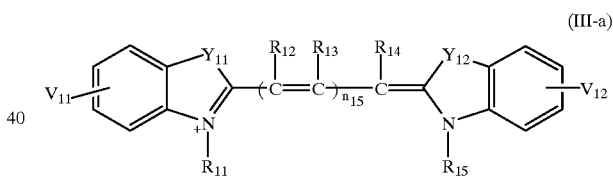
(III-a)

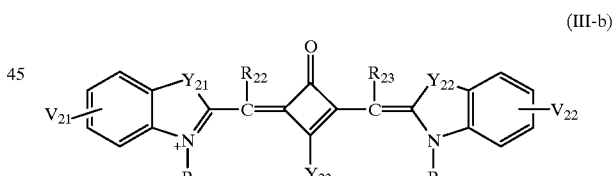
(III-b)

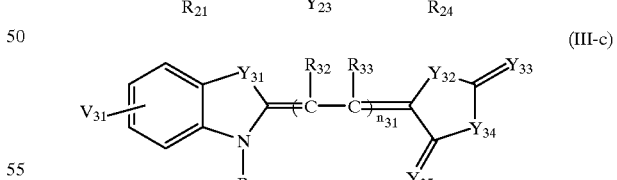
(III-c)

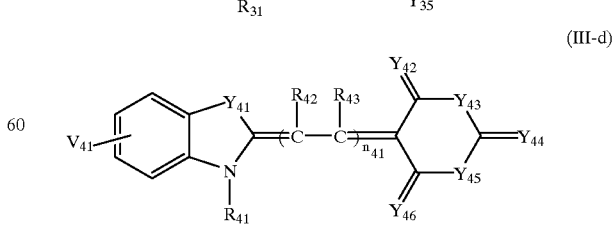
(III-d)

In formulae (III-a) to (III-d), $R_{11}$, $R_{12}$, $R_{13}$, $R_{14}$, $R_{15}$, $R_{21}$, $R_{22}$, $R_{23}$, $R_{24}$, $R_{31}$, $R_{32}$, $R_{33}$, $R_{41}$, $R_{42}$, and $R_{43}$ each represent a hydrogen atom, an alkyl group, an aryl group or a heterocyclic group; $Y_{11}$, $Y_{12}$, $Y_{21}$, $Y_{22}$, $Y_{31}$, $Y_{32}$, $Y_{33}$, $Y_{34}$, $Y_{35}$, $Y_{41}$, $Y_{42}$, $Y_{43}$, $Y_{44}$, $Y_{45}$, and $Y_{46}$ each represent an oxygen atom, a sulfur atom, a selenium atom, a tellurium atom, —$CR_{16}R_{17}$— or —$NR_{18}$—; $R_{16}$, $R_{17}$, and $R_{18}$ each represent a hydrogen atom, an alkyl group, an aryl group or a heterocyclic group; $Y_{23}$ represents $O^-$, $S^-$, $Se^-$, $Te^-$or —$NR_{18}^-$; $V_{11}$, $V_{12}$, $V_{21}$, $V_{22}$, $V_{31}$, and $V_{41}$ each represent a substituent; and n15, n31, and n41 each represent an integer of 1 to 6.

The compounds of formulae (III-a) to (III-d) may have a counter ion in agreement with the charge quantity of the whole molecule.

In formulae (III-a) to (III-d), the alkyl, aryl, and heterocyclic groups may have a substituent; the alkyl group may be straight or branched; and the aryl or the heterocyclic group may be monocyclic or polycyclic (condensed rings or independent rings).

Examples of the above-described methine dyes are described in detail in M. Okawara, T. Kitao, T. Hirashima, and M. Matuoka, Organic Colorants, Elsevier.

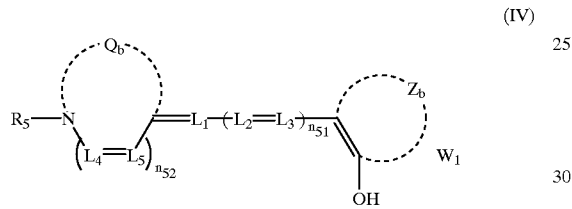

(IV)

wherein $Q_b$ represents an atom group necessary to complete a 5- or 6-membered nitrogen-containing heterocyclic ring which may have a condensed ring and may have a substitutent; $Z_b$ represents an atom group necessary to complete a 3- to 9-membered ring, the atom group being composed of atoms selected from carbon, oxygen, nitrogen, sulfur, and hydrogen; $L_1$, $L_2$, $L_3$, $L_4$, and $L_5$ each represent a substituted or unsubstituted methine group; n., represents an integer of 0 to 4; $n_{52}$ represents 0 or 1; $R_5$ represents a substituent; and $W_1$ represents a counter ion where necessary to neutralize the charge quantity.

In formula (IV), the 5- or 6-membered heterocyclic ring completed by $Q_b$ preferably includes benzothiazole, benzoxazole, benzoselenazole, benzotellurazole, 2-quinoline, 4-quinoline, benzimidazole, thiazoline, indolenine, oxadiazole, thiazole, and imidazole nuclei. Preferred of them are benzothiazole, benzoxazole, benzimidazole, benzoselenazole, 2-quinoline, 4-quinoline, and indolenine nuclei. Particularly preferred of them are benzothiazole, benzoxazole, 2-quinoline, 4-quinoline, and indolenine nuclei. The substituent that can be on the ring includes a carboxyl group, a phosphonic acid group, a sulfonic acid group, a halogen atom (i.e., F, Cl, Br or I), a cyano group, an alkoxy group (e.g., methoxy, ethoxy or methoxyethoxy), an aryloxy group (e.g., phenoxy), an alkyl group (e.g., methyl, ethyl, cyclopropyl, cyclohexyl, trifluoromethyl, methoxyethyl, allyl or benzyl), an alkylthio group (e.g., methylthio or ethylthio), an alkenyl group (e.g., vinyl or 1-propenyl), and an aryl or heterocyclic group (e.g., phenyl, thienyl, toluoyl or chlorophenyl).

The 3- to 9-membered ring completed by $Z_b$ preferably has a skeleton made up of 4 to 6 carbon atoms. Preferred rings completed by $Z_b$ are the following structures (a) to (e). Structure (a) is the most desirable.

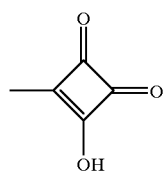

(a)

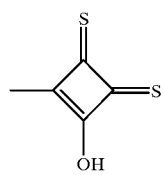

(b)

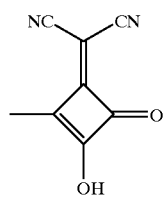

(c)

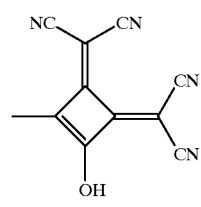

(d)

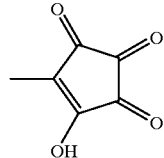

(e)

Substituents that may be on the methine groups $L_1$ $L_2$, $L_3$, $L_4$, and $L_5$ include a substituted or unsubstituted alkyl group (preferably an alkyl group having 1 to 12, particularly 1 to 7, carbon atoms, such as methyl, ethyl, propyl, isopropyl, cyclopropyl, butyl, 2-carboxyethyl or benzyl), a substituted or unsubstituted aryl group (preferably an aryl group having 6 to 10 carbon atom, particularly 6 to 8 carbon atoms, such as phenyl, toluoyl, chlorophenyl or o-carboxyphenyl), a heterocyclic group (e.g., pyridyl, thienyl, furanyl, pyridyl or barbituric acid), a halogen atom (e.g., chlorine or bromine), an alkoxy group (e.g., methoxy or ethoxy), an amino group (preferably an amino group having 1 to 12, particularly 6 to 12, carbon atoms, e.g., diphenylamino, methylphenylamino or 4-acetylpiperazin-1-yl), and an oxo group. The substituents on the methine group may be connected to each other to form such a ring as a cyclopentene ring, a cyclohexene ring or a squarylium ring. The substituent can form a ring together with an auxochrome.

$n_{51}$ preferably represents an integer of from 0 to 3.

$R_5$ preferably represents a substituted or unsubstituted aromatic group or a substituted or unsubstituted aliphatic group. The aromatic group preferably has 1 to 16, particularly 5 or 6, carbon atoms, and the aliphatic group preferably has 1 to 10, particularly 1 to 6, carbon atoms. The aliphatic and aromatic groups as unsubstituted include methyl, ethyl, n-propyl, n-butyl, phenyl, and naphthyl groups.

While $W_1$ represents a counter ion where necessary to neutralize the charge quantity, whether a dye is cationic or anionic or whether or not it has a net ionic charge depends on its auxochrome and substituent. Where a dye carries a dissociating group, it can dissociate to possess a negative charge. In this case, too, the total amount of charges is neutralized with $W_1$. Typical cations include inorganic or organic ammonium ions (e.g., tetraalkylammonium ion and pyridinium ion) and alkali metal ions. Anions, which may be either organic or inorganic, include halide ions (e.g., fluoride, chloride, bromide or iodide ions), substituted arylsulfonate ions (e.g., p-toluenesulfonate ion or p-chlorobenzenesulfonate ion), aryldisulfonate ions (e.g., 1,3-benzenedisulfonate ion, 1,5-naphthalenedisulfonate ion, and 2,6-naphthalenedisulfonate ion), alkylsulfate ions (e.g., methylsulfate ion), a sulfate ion, a thiocyanate ion, a perchlorate ion, a tetrafluoroborate ion, a picrate ion, an acetate ion, and a trifluoromethanesulfonate ion.

$W_1$, as a charge balancing counter ion, could be an ionic polymer or a dye having an opposite charge. A metal complex ion (e.g., bisbenzene-1,2-dithiolatonickel (III)) also serves as $W_1$.

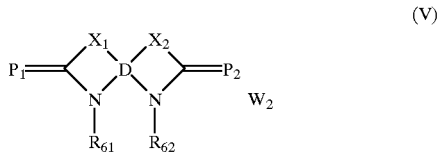

(V)

wherein D represents an aromatic group having at least tetrafunctionality; $X_1$ and $X_2$ each represent a sulfur atom, a selenium atom, $CR_{63}R_{64}$ or $CR_{65}=CR_{66}$, wherein $R_{63}$, $R_{64}$, $R_{65}$, and $R_{66}$ each represent a hydrogen atom or an alkyl group; $R_{61}$ and $R_{62}$ each represent an alkyl group or an aromatic group; $P_1$ and $P_2$ each represent a non-metallic atom group necessary to complete a polymethine dye; and $W_2$ represents a counter ion where necessary to neutralize the charge of the whole molecule.

In formula (V), the aromatic group having tetra- or higher-functionality represented by D includes those derived from aromatic hydrocarbons such as benzene, naphthalene, anthracene, and phenanthrene; and those derived from aromatic heterocyclic compounds such as anthraquinone, carbazole, pyridine, quinoline, thiophene, furan, xanthene, and thianthrene. The group D may have a substituent on a position other than the linking positions. D is preferably a group derived from an aromatic hydrocarbon, particularly benzene or naphthalene.

$X_1$ and $X_2$ each preferably represent a sulfur atom or $CR_{63}R_{64}$, particularly $CR_{63}R_{64}$.

While the polymethine dye represented by formula (V) can embrace various kinds according to $P_1$, and $P_2$, it typically includes cyanine dyes, merocyanine dyes, rhodacyanine dyes, trinuclear merocyanine dyes, allopolar dyes, hemicyanine dyes, and styryl dyes. The cyanine dyes include those in which the substituents on the methine chain form a squarylium ring or a croconium ring. For the details of these dyes, reference can be made in F. M. Harmer, *Heterocyclic Compounds-Cyanine Dyes and Related Compounds*, John Wiley & Sons (1964) and D. M. Sturmer, *Heterocyclic Compounds-Special Topics in Heterocyclic Chemistry*, ch. 18, §14, cls. 482–515, John Wiley & Sons (1977). The cyanine dyes, merocyanine dyes, and rhodacyanine dyes described in U.S. Pat. No. 5,340,694 with the respective formulae (XI), (XII), and (XIII) are preferred. It is preferred for at least one, desirably both, of the methine chains contained in $P_1$ and $P_2$ to have a squarylium ring.

$R_{61}$ and $R_{62}$ each represent a substituted or unsubstituted aromatic group or a substituted or unsubstituted aliphatic group. The aromatic group preferably has 5 to 16, particularly 5 or 6, carbon atoms, and the aliphatic group preferably has 1 to 10, particularly 1 to 6, carbon atoms. Examples of the aliphatic and aromatic groups as unsubstituted include methyl, ethyl, n-propyl, n-butyl, phenyl, and naphthyl groups.

The compound of formula (V) preferably carries an acidic group in at least one of $R_{61}$, $R_{62}$, $P_1$, and $P_2$. The term "lacidic group" is intended to mean a substituent having a dissociating proton and includes a group derived from a carboxylic acid, phosphonic acid, sulfonic acid, boric acid, etc., with a carboxyl group being preferred. The acidic group may release the proton to take a dissociated form.

$W_2$ has the same meaning as $W_1$ in formula (IV).

Specific but non-limiting preferred examples of the methine dyes represented by formulae (II) to (V) are shown below.

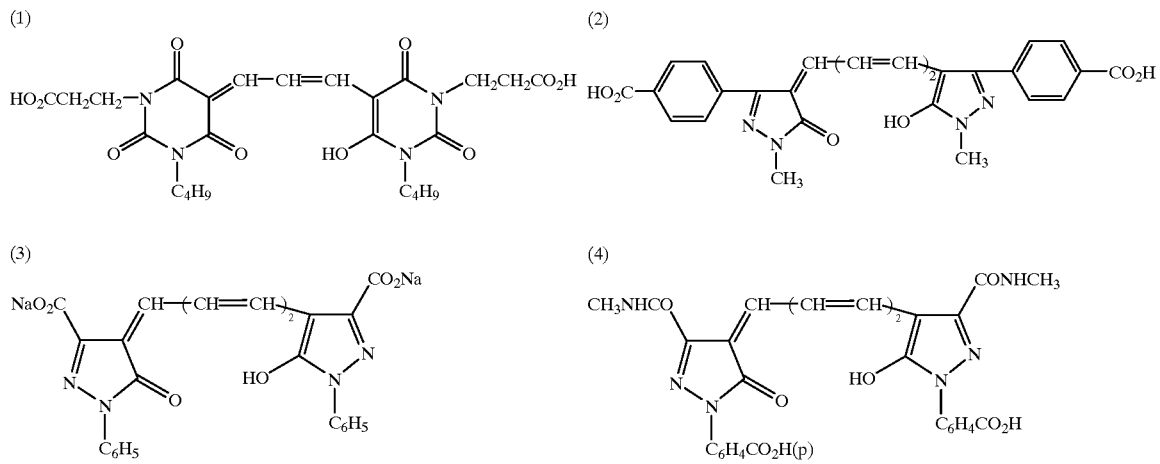

-continued
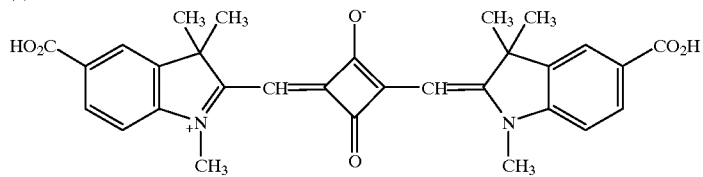
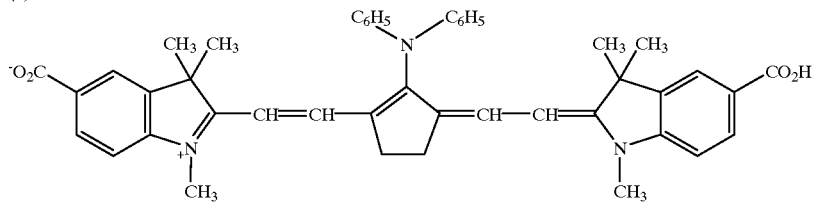
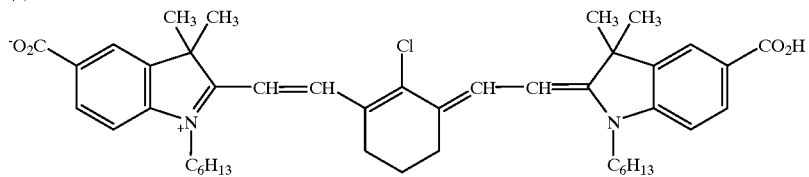
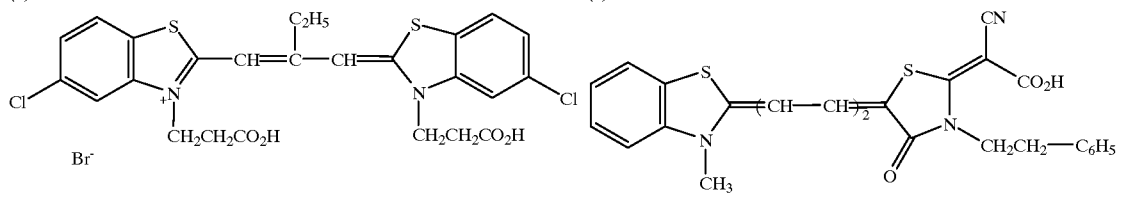
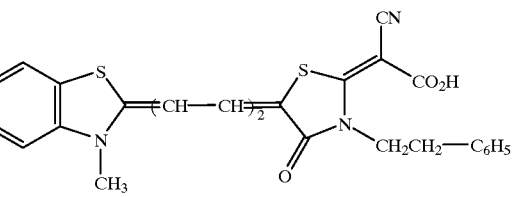
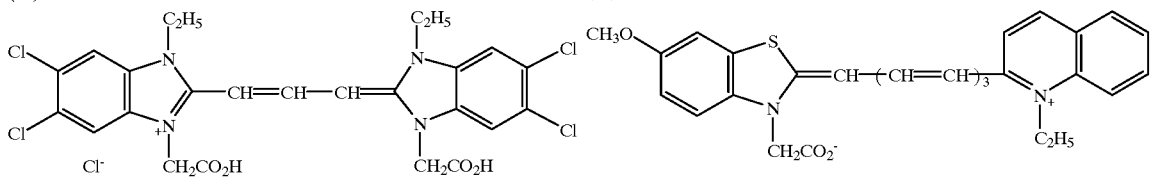
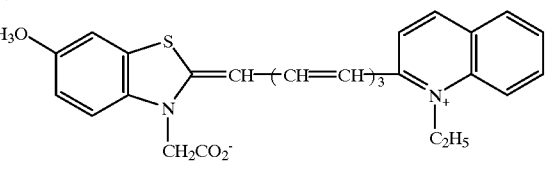
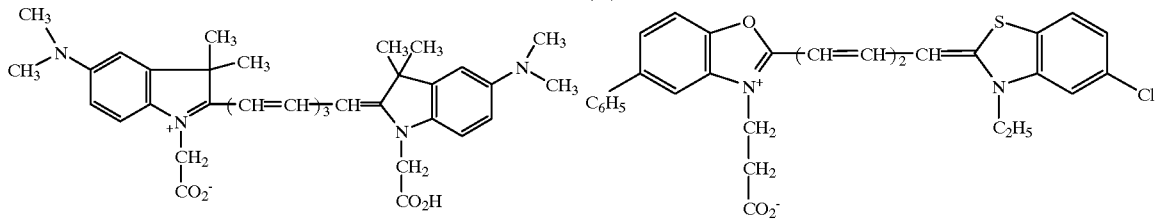
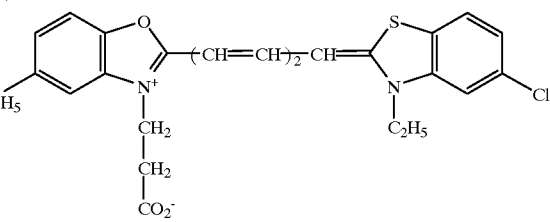

-continued
(14)
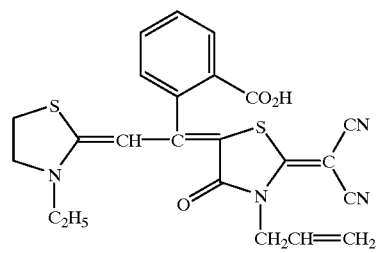
(15)
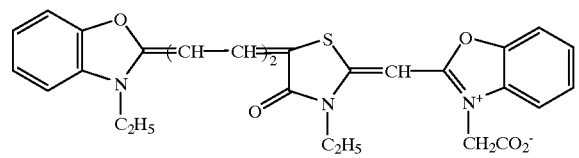
(16)
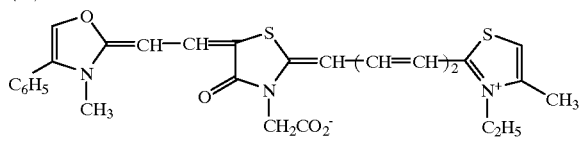
(17)
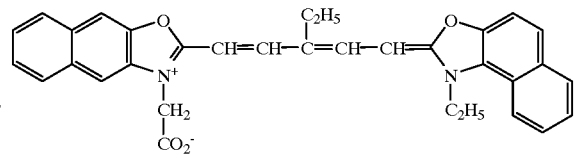
(18)
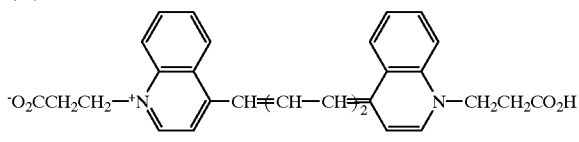
(19)
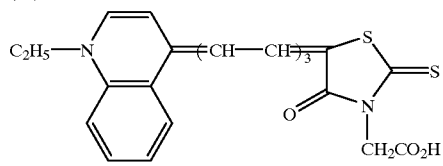
(20)
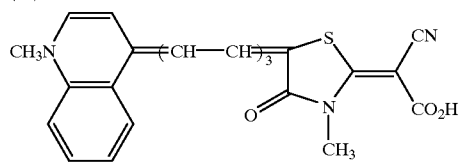
(21)
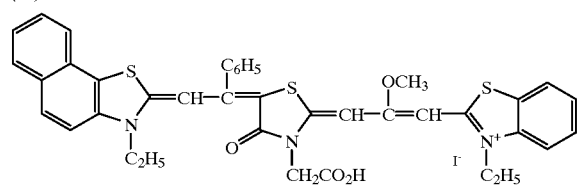
(22)
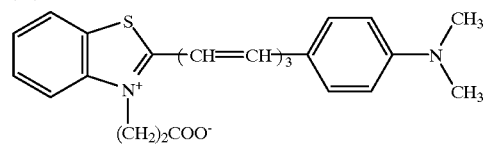
(23)
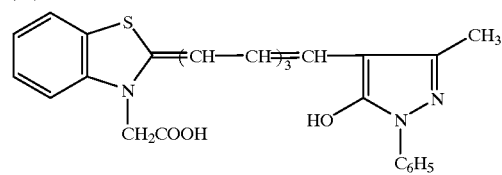
(24)
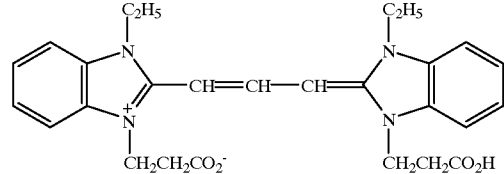
(25)
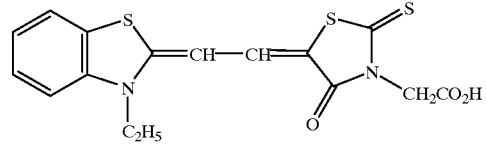
(26)
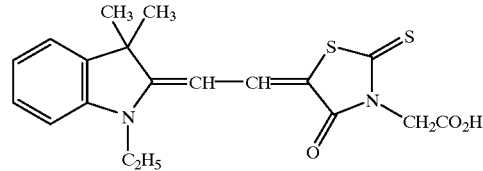
(27)
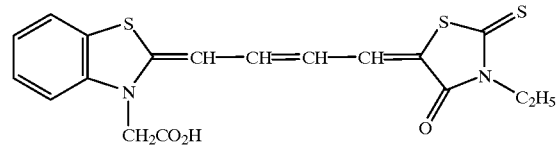

-continued
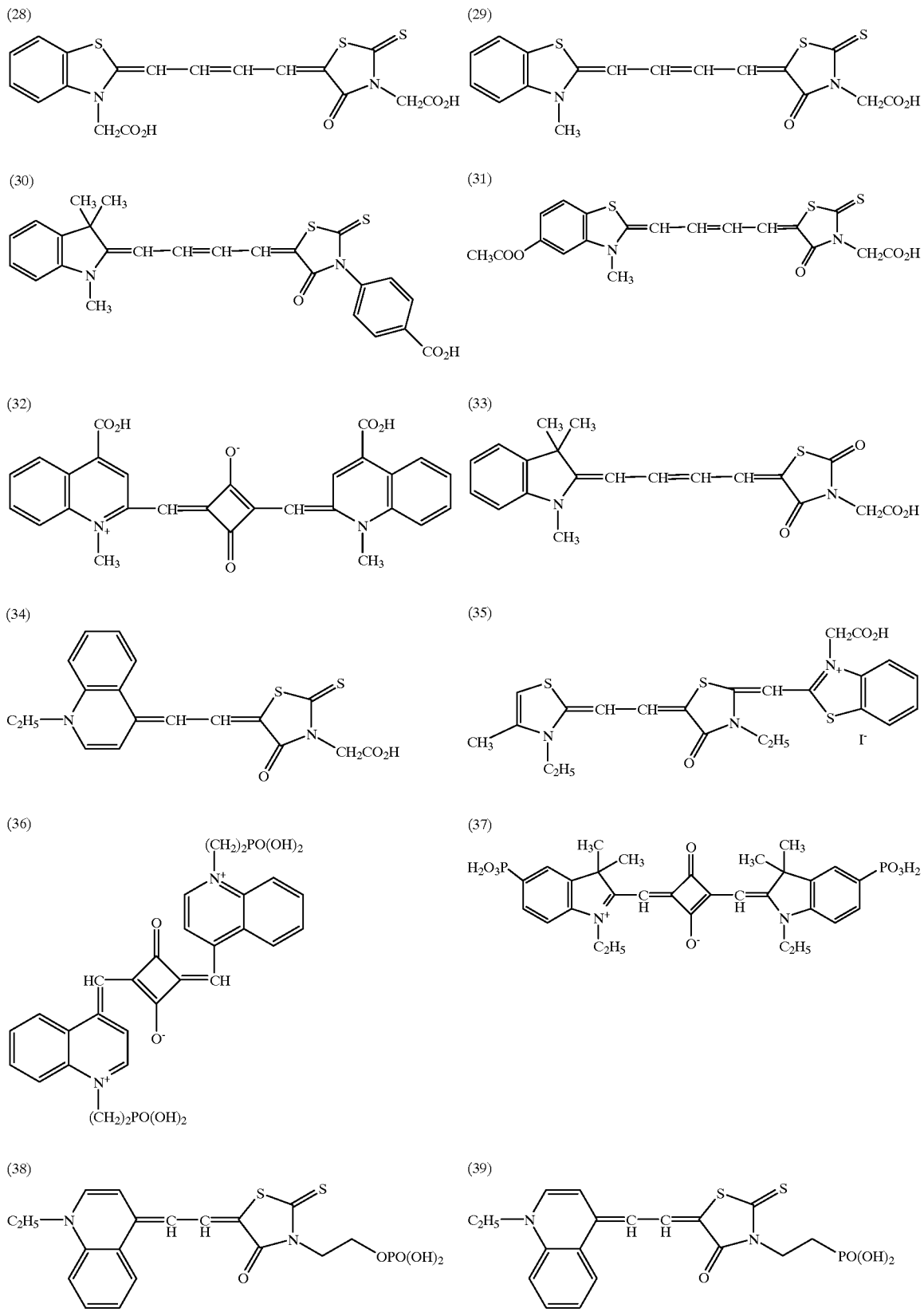

-continued
(40) 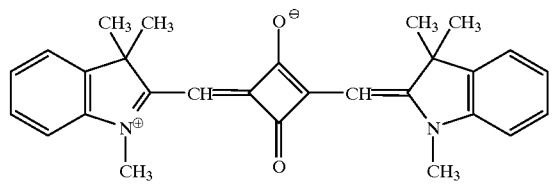
(41) 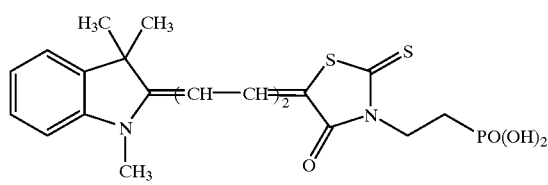
(42) 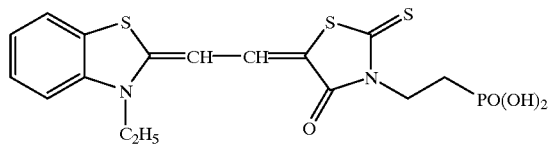
(43) 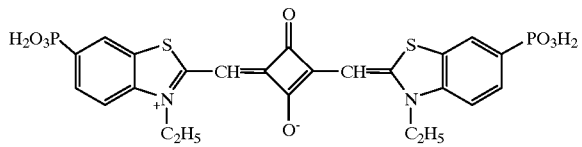
S-1 to S-11:
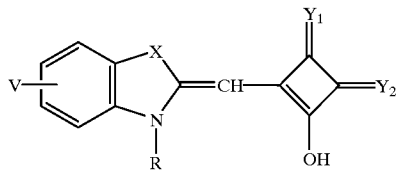
| Compound No. | X | V | R | $Y_1$ | $Y_2$ |
| --- | --- | --- | --- | --- | --- |
| S-1 | $C(CH_3)_2$ | 4,5-benzo | $C_3H_7$ | O | O |
| S-2 | $C(CH_3)_2$ | H | $(CH_3)_2COOH$ | O | O |
| S-3 | $C(CH_3)_2$ | 4,5-benzo | $C_2H_5$ | S | S |
| S-4 | $C(CH_3)_2$ | 4,5-benzo | $C_2H_5$ | $C(CN)_2$ | O |
| S-5 | $C(CH_3)_2$ | 4,5-benzo | $C_2H_5$ | $C(CN)_2$ | $C(CN)_2$ |
| S-6 | S | H | $C_2H_5$ | O | O |
| S-7 | S | 5,6-benzo | $CH_3$ | O | O |
| S-8 | O | H | $CH_3$ | O | O |
| S-9 | Se | H | $CH_3$ | O | O |
| S-10 | $NC_3H_5$ | H | $CH_3$ | O | O |
| S-11 | —CH═— | H | $C_2H_5$ | O | O |
S-12:
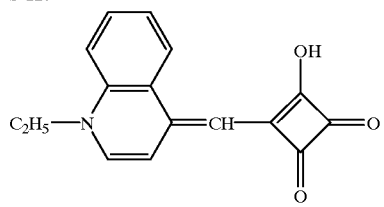
S-13 to S-18:
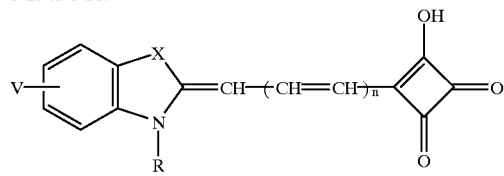
| Compound No. | X | V | R | n |
| --- | --- | --- | --- | --- |
| S-13 | $C(CH_3)_2$ | H | $CH_3$ | 1 |
| S-14 | $C(CH_3)_2$ | 4,5-benzo | $C_2H_5$ | 1 |
| S-15 | S | H | $CH_3$ | 2 |
| S-16 | S | 5,6-benzo | $C_2H_5$ | 3 |
| S-17 | S | 5,6-benzo | $C_2H_5$ | 4 |
| S-18 | O | H | $CH_3$ | 4 |

-continued

S-19 to S-22:

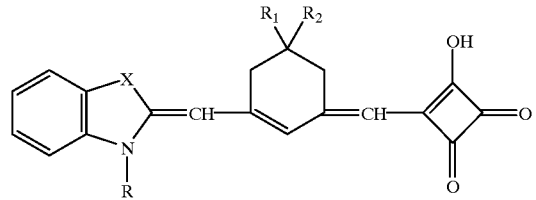

| Compound No. | X | $R_1$ | $R_2$ | R |
| --- | --- | --- | --- | --- |
| S-19 | $C(CH_3)_2$ | $CH_3$ | $CH_3$ | $C_2H_5$ |
| S-20 | S | $CH_3$ | $CH_3$ | $C_2H_5$ |
| S-21 | O | $CH_3$ | $CH_3$ | $(CH_3)_3COOH$ |
| S-22 | O | Ph | H | $C_2H_5$ |

S-23 to S-27:

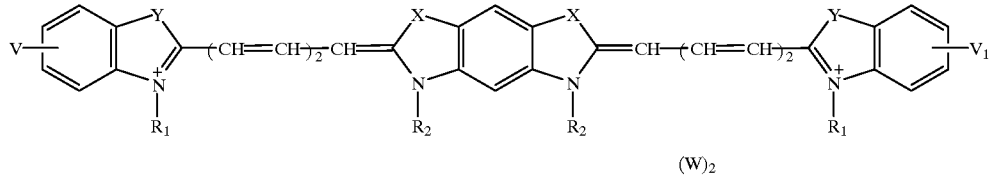

$(W)_2$

| Compound No. | X | Y | $R_1$ | $R_2$ | $V_1$ | W |
| --- | --- | --- | --- | --- | --- | --- |
| S-23 | S | S | $CH_3$ | $CH_3$ | H | $I^-$ |
| S-24 | S | S | $C_2H_5$ | $CH_3$ | 5-COOH | $I^-$ |
| S-25 | $C(CH_3)_2$ | $CH_3$ | $CH_3$ | $CH_3$ | 5-COOH | $I^-$ |
| S-26 | $C(CH_3)_2$ | $C(CH_3)_2$ | $CH_2CH_2COOH$ | $C_2H_5$ | H | $Cl^-$ |
| S-27 | O | $C(CH_3)_2$ | $CH_3$ | $C_2H_5$ | H | $I^-$ |

S-28 to S-32:

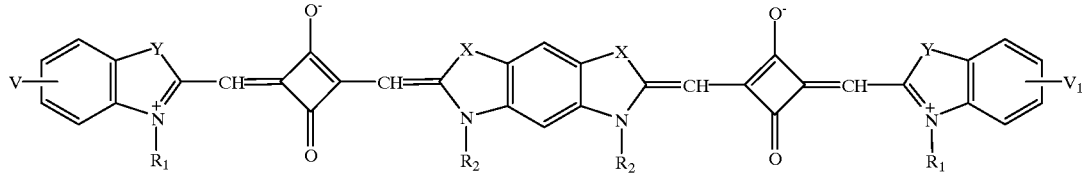

| Compound No. | X | Y | $R_1$ | $R_2$ | $V_1$ |
| --- | --- | --- | --- | --- | --- |
| S-28 | S | $C(CH_3)_2$ | $CH_3$ | $CH_3$ | H |
| S-29 | S | $C(CH_3)_2$ | $CH_3H_7$ | $CH_3$ | 4,5-benzo |
| S-30 | $C(CH_3)_2$ | S | $CH_3$ | $CH_3$ | 5-COOH |
| S-31 | $C(CH_3)_2$ | $C(CH_3)_2$ | $CH_3$ | $CH_3$ | 5-COOH |
| S-32 | $C(CH_3)_2$ | $NCH_3$ | $CH_3$ | $C_2H_5$ | 5-$CH_3$ |

S-33 to S-37:

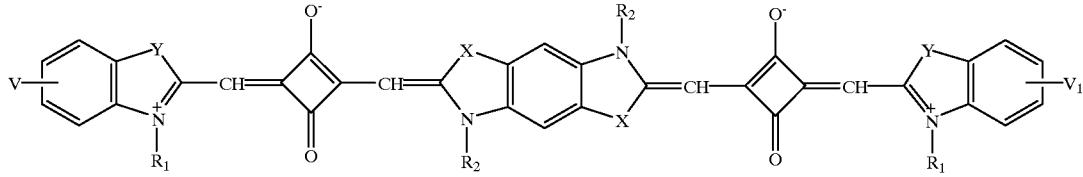

| Compound No. | X | Y | $R_1$ | $R_2$ | $V_1$ |
| --- | --- | --- | --- | --- | --- |
| S-33 | S | $C(CH_3)_2$ | $CH_3$ | $CH_3$ | H |
| S-34 | S | $C(CH_3)_2$ | $CH_2H_5$ | $CH_3$ | 5-$SO_3H$ |
| S-35 | $C(CH_3)_2$ | $C(CH_3)_2$ | $CH_3$ | $CH_2H_5$ | 5-COOH |
| S-36 | $C(CH_3)_2$ | $C(CH_3)_2$ | $CH_2CH_2COOH$ | $CH_3$ | 4,5-benzo |
| S-37 | $C(CH_3)_2$ | $NCH_3$ | $CH_3$ | $CH_2H_5$ | 5-$CH_3$ |

-continued

S-38:
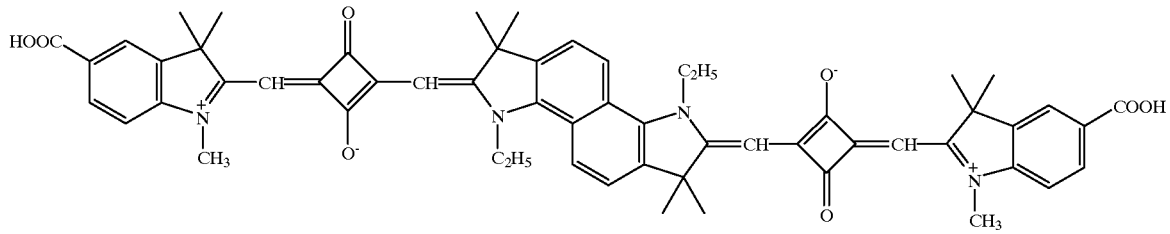

S-39:
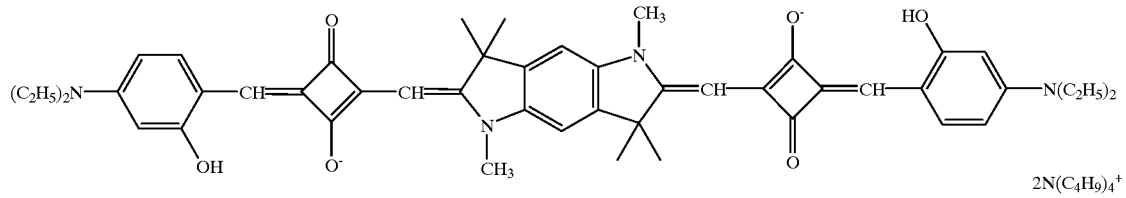

S-40:
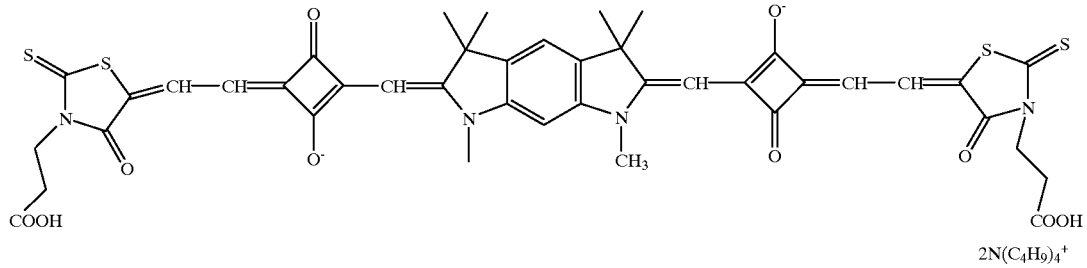

S-41:
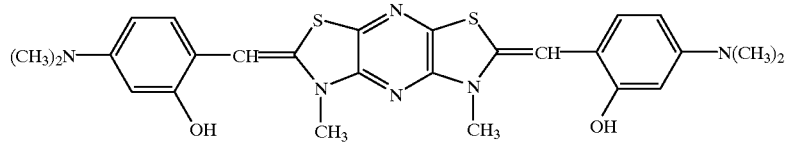

S-42:
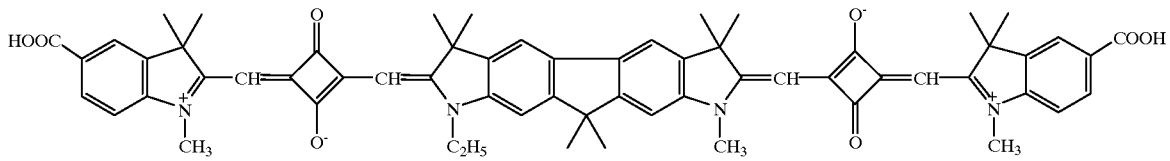

The compounds of formulae (II) and (III) are synthesized with reference to the teachings of F. M. Harmer, Heterocyclic Compounds-Cyanine Dyes and Related Compounds, John Wiley & Sons (1964), D. M. Sturmer, *Heterocyclic Compounds-Special Topics in Heterocyclic Chemistry*, ch. 18, §14, cls. 482–515, John Wiley & Sons (1977), and Rodd's *Chemistry of Carbon Compounds*, 2nd Ed., vol. IV, part B, ch. 15, cls. 369–422, Elsevier Science Publishing Company Inc. (1977), and GB Patent 1,077,611. The compounds of formula (IV) are synthesized with reference to the disclosure, e.g., of *Dyes and Pigments*, vol. 21, pp. 227–234. The compounds of formula (V) are synthesized with reference, e.g., to *Ukrainskii Khimicheskii Zhurnal*, vol.40, No. 3, pp. 253–258, *Dyes and Pigments*, vol. 21, pp. 227–234, and the references cited therein.

Adsorption of the dyes onto semiconductor particles is usually effected by dipping a well-dried work electrode having semiconductor particles in a dye solution (which can be embodied by immersion, dip coating, roll coating, air knife coating, etc.) or coating the semiconductor layer with a dye solution (which can be embodied by wire bar coating, slide hopper coating, extrusion coating, curtain coating, spin coating, spraying, letterpress printing, offset printing, gravure printing, screen printing, etc.). In case of dipping, the dye adsorption may be either at room temperature or under reflux as taught in JP-A-7-249790.

The solvent of the dye solution is selected appropriately according to the solubility of the dye. Solvents of choice include water, alcohols (e.g., methanol, ethanol, t-butanol and benzyl alcohol), nitrites (e.g., acetonitrile, propionitrile and 3-methoxypropionitrile), nitromethane, halogenated hydrocarbons (e.g., dichloromethane, dichloroethane, chloroform, and chlorobenzene), ethers (e.g., diethyl ether and tetrahydrofuran), dimethyl sulfoxide, amides (e.g., N,N-dimethylformamide and N,N-dimethylacetamide), N-methylpyrrolidone, 1,3-dimethylimidazolidinone, 3-methyloxazolidinone, esters (e.g., ethyl acetate and butyl acetate), carbonic esters (e.g., diethyl carbonate, ethylene carbonate, and propylene carbonate), ketones (e.g., acetone, 2-butanone, and cyclohexanone), hydrocarbons (e.g., hexane, petroleum ether, benzene, and toluene), and mixtures thereof.

As previously mentioned with regard to the formation of the particulate semiconductor layer, extrusion coating and various printing methods are fit for a high viscous dye solution (e.g., 0.01 to 500 Poise), while slide hopper coating, wire bar coating and spin coating are suited for a low viscous dye solution (e.g., 0.1 Poise or lower) to form a uniform film. In this way, an appropriate technique for dye adsorption is to be selected according to such parameters as the viscosity of the dye solution, the coating weight, the kind of the support, the speed of application, and the like. Taking the suitability to large-scale production, the time required for dye adsorption after dye application is conveniently as short as possible.

In order to obtain a sufficient sensitizing effect, the dyes are preferably adsorbed in a total amount of 0.01 to 100 mmol per $m^2$ of the support and 0.01 to 1 mmol per gram of the semiconductor particles. With too small a total amount of the dyes, the sensitizing effect would be insufficient. If the dyes are used in too large a total amount, the non-adsorbed dyes will float only to lessen the sensitizing effect.

The above-described heat treatment of the semiconductor layer before dye adsorption is favorable for increasing the amount of the dyes adsorbed. Where the heat treatment is conducted, it is preferred that the dyes be quickly adsorbed into the heated semiconductor layer while it is between 40° C. and 80° C. so as to prevent water from being adsorbed to the semiconductor particles.

A colorless compound may be adsorbed together with the dyes so as to lessen the interaction among dye molecules, such as association. Hydrophobic compounds such as carboxyl-containing steroid compounds (e.g., chenodeoxycholic acid) can be used for this purpose. Ultraviolet absorbers may be adsorbed in combination to prevent deterioration by ultraviolet light.

Because dyes remaining unadsorbed cause disturbances of device performance, they should be washed away immediately after adsorption. Washing is conveniently carried out in a wet washing tank with an organic solvent, such as a polar solvent (e.g., acetonitrile) or an alcohol. If desired, the surface of the semiconductor particles can be treated with an amine after dye adsorption so as to accelerate removal of the unadsorbed dyes. Preferred amines include pyridine, 4-t-butylpyridine, and polyvinylpyridine. The amine can be used as such where it is liquid, or as dissolved in an organic solvent.

The charge transporting layer is a layer comprising a charge transporting material which replenishes oxidized dyes with electrons. Charge transporting materials which can be used in the invention typically include a solution of a redox ion system (i.e., an electrolytic solution), a gel electrolyte comprising a polymer matrix gel impregnated with a solution of a redox ion system, a molten salt electrolyte containing a redox ion system, and a solid electrolyte. In place of the charge transporting materials in which ions participate, solid materials in which carriers migrate to serve for electric conduction, i.e., electron transporting materials or hole-transporting materials, can also be used.

Molten salts which can be used in the invention include known iodine salts described, e.g., in WO 95/18456, JP-A-8-259543, and *Denki Kagaku*, vol. 65, No. 11, p. 923 (1997), such as pyridinium iodides, imidazolium iodides, and triazolium iodides. Preferred molten salts include those represented by the following formulae (Y-a), (Y-b), and (Y-c):

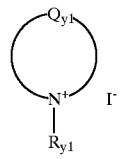
(Y-a)

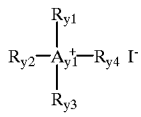
(Y-b)

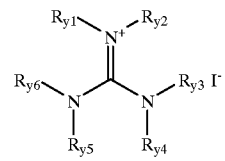
(Y-c)

In formula (Y-a), $Q_{y1}$ represents an atomic group forming a 5- or 6-membered aromatic ring cation together with the nitrogen atom. $Q_{y1}$ is preferably made up of atoms selected from carbon, hydrogen, nitrogen, oxygen, and sulfur. The 5-membered ring completed by $Q_{y1}$ is preferably an oxazole ring, a thiazole ring, an imidazole ring, a pyrazole ring, an isoxazole ring, a thiadiazole ring, an oxadiazole ring or a triazole ring, still preferably an oxazole ring, a thiazole ring or an imidazole ring, particularly preferably an oxazole ring or an imidazole ring. The 6-membered ring completed by $Q_{y1}$ is preferably a pyridine ring, a pyrimidine ring, a pyridazine ring, a pyrazine ring or a triazine ring, with a pyridine ring being still preferred.

In formula (Y-b), $A_{y1}$ represents a nitrogen atom or a phosphorus atom.

In formulae (Y-a), (Y-b) and (Y-c), $R_{y1}$, $R_{y2}$, $R_{y3}$, $R_{y4}$, $R_{y5}$, and $R_{y6}$ each represent a substituted or unsubstituted alkyl group (preferably a straight-chain, branched or cyclic alkyl group having 1 to 24 carbon atoms, such as methyl, ethyl, propyl, isopropyl, pentyl, hexyl, octyl, 2-ethylhexyl, t-octyl, decyl, dodecyl, tetradecyl, 2-hexyldecyl, octadecyl, cyclohexyl, or cyclopentyl) or a substituted or unsubstituted alkenyl group (preferably a straight-chain or branched alkenyl group having 2 to 24 carbon atoms, such as vinyl or allyl). $R_{y1}$, $R_{y2}$, $R_{y3}$, $R_{y4}$, $R_{y5}$, and $R_{y6}$ each preferably represent an alkyl group having 2 to 18 carbon atoms or an alkenyl group having 2 to 18 carbon atoms, particularly an alkyl group having 2 to 6 carbon atoms.

In formula (Y-b), two or more of $R_{y1}$, $R_{y2}$, $R_{y3}$ and $R_{y4}$ may be taken together to form a non-aromatic ring containing $A_{y1}$. In formula (Y-c), two or more of $R_{y1}$, $R_{y2}$, $R_{y3}$, $R_{y4}$, $R_{y5}$, and $R_{y6}$, may be taken together to form a cyclic structure.

In formulae (Y-a), (Y-b) , and (Y-c), $Q_{y1}$, $R_{y1}$, $R_{y2}$, $R_{y3}$, $R_{y4}$, $R_{y5}$, and $R_{y6}$ may have a substituent. Suitable substituents include a halogen atom (e.g., F, Cl, Br or I), a cyano group, an alkoxy group (e.g., methoxy or ethoxy), an aryloxy group (e.g., phenoxy), an alkylthio group (e.g., methylthio or ethylthio), an alkoxycarbonyl group (ethoxycarbonyl), a carbonic ester group (e.g., ethoxycarbonyloxy), an acyl group (e.g., acetyl, propionyl or benzoyl), a sulfonyl group (e.g., methanesulfonyl or benzenesulfonyl), an acyloxy group (e.g., acetoxy or benzoyloxy), a sulfonyloxy group (e.g., methanesulfonyloxy or toluenesulfonyloxy), a phosphonyl group (e.g., diethylphosphonyl), an amido group (e.g., acetylamino or benzoylamino), a carbamoyl group (e.g., N,N-dimethylcarbamoyl), an alkyl group (methyl, ethyl, propyl, isopropyl, cyclopropyl, butyl, 2-carboxyethyl or benzyl), an aryl group (e.g., phenyl or toluyl), a heterocyclic group (e.g., pyridyl, imidazolyl or furanyl), and an alkenyl group (e.g., vinyl or 1-propenyl).

The compounds represented by formulae (Y-a), (Y-b) or (Y-c) may form dimers or polymers at $Q_{y1}$, $R_{y1}$, $R_{y2}$, $R_{y3}$, $R_{y4}$, $R_{y5}$ or $R_{y6}$.

These molten salts may be used either individually or as a mixture of two or more-thereof or in combination with other molten salts of the above-described structures in which the iodide anion is replaced with other anions, preferably other halide ions (e.g., Cl$^-$ and Br$^-$), NSC$^-$, BF$_4^-$, PF$_6^-$, ClO$_4^-$, (CF$_3$SO$_2$)$_2$N$^-$, (CF$_3$CF$_2$SO$_2$)$_2$N$^-$, CF$_3$SO$_3^-$, CF$_3$COO$^-$, CF$_3$COO$^-$, Ph$_4$B$^-$, and (CF$_3$SO$_2$)$_3$C$^-$, particularly (CF$_3$SO$_2$)$_2$N$^-$ or BF$_4^-$. Other iodine salts, such as LiI, can also be added.

While the molten salt can be used with or without the solvent hereinafter described, it is preferred that the molten salt be present in an amount of at least 50% by weight based on the total electrolyte composition and that 50% by weight or more of the molten salt be the iodine salt.

It is preferable to add iodine to the electrolyte composition comprising the molten salt. Iodine is preferably added in an amount of 0.1 to 20% by weight, particularly 0.5 to 5% by weight, based on the total electrolyte composition.

Specific examples of molten salts which are preferably used in the invention are shown below for illustrative purposes only but not for limitation.

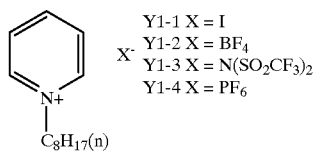

(Y1)

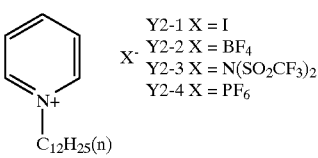

(Y2)

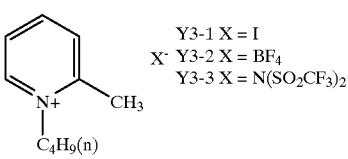

(Y3)

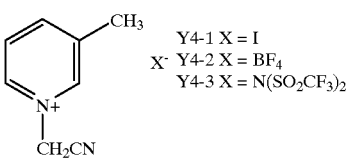

(Y4)

-continued

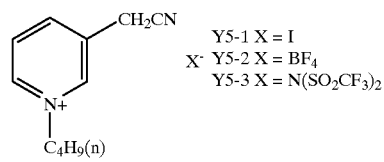

(Y5)

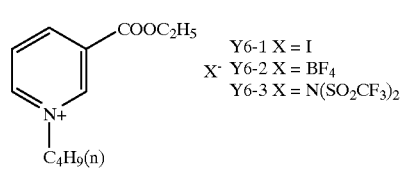

(Y6)

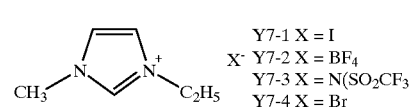

(Y7)

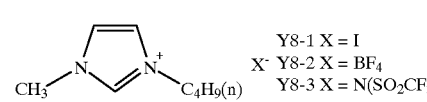

(Y8)

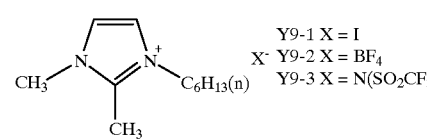

(Y9)

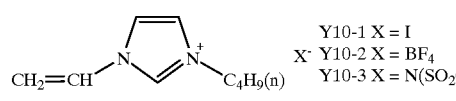

(Y10)

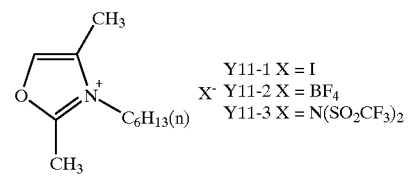

(Y11)

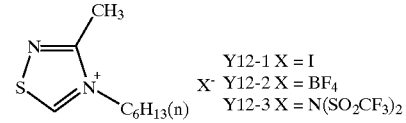

(Y12)

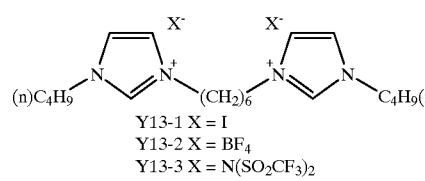

(Y13)

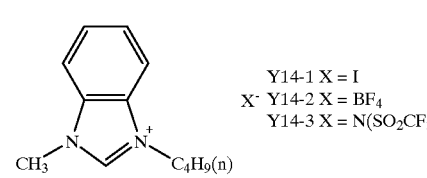

(Y14)

-continued
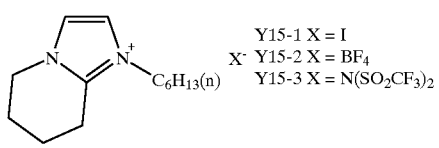 (Y15)
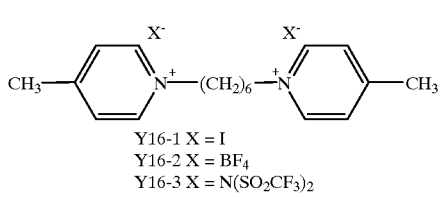 (Y16)
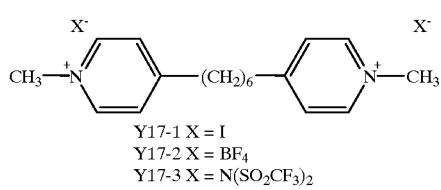 (Y17)
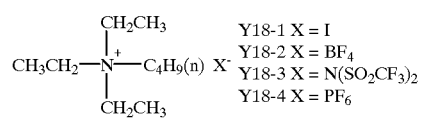 (Y18)
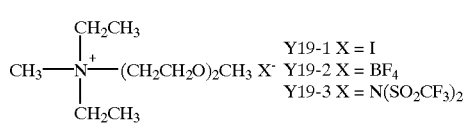 (Y19)
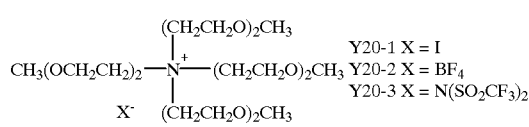 (Y20)
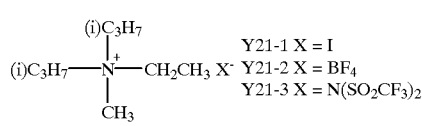 (Y21)
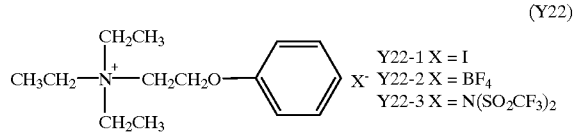 (Y22)
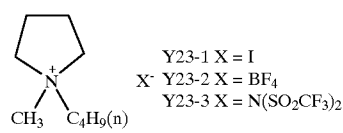 (Y23)
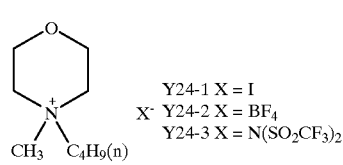 (Y24)
-continued
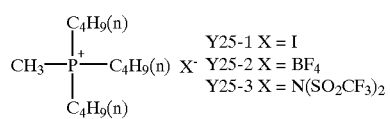 (Y25)
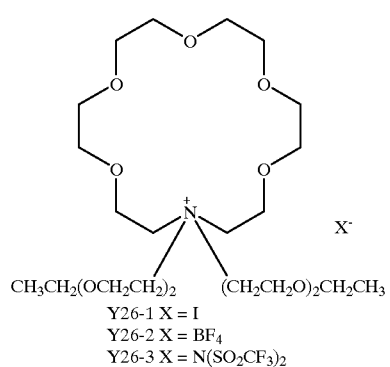 (Y26)
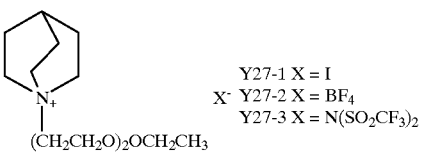 (Y27)
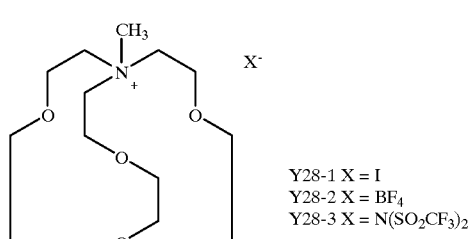 (Y28)
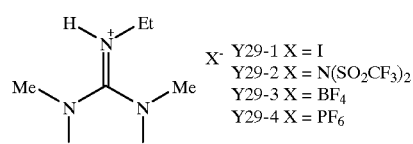 (Y29)
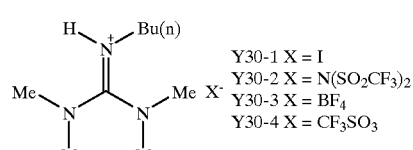 (Y30)
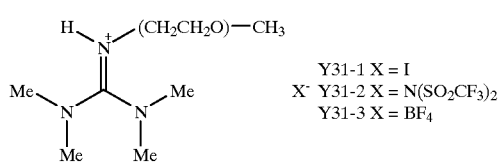 (Y31)

(Y32)
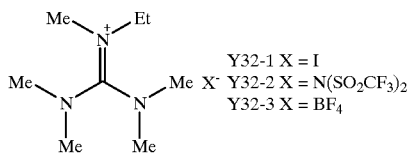

(Y33)
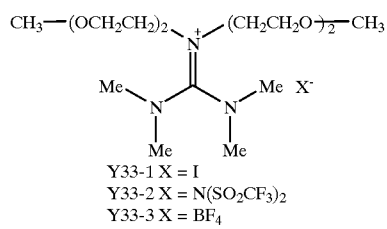

(Y34)
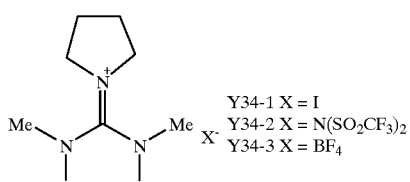

(Y35)
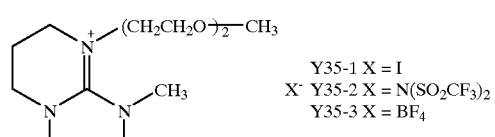

(Y36)
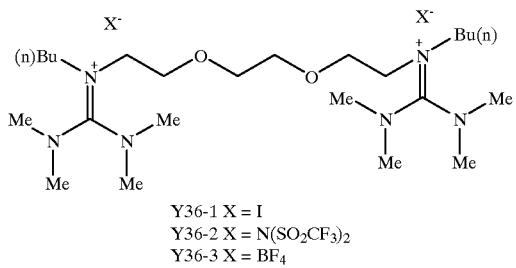

The electrolytic solution which can be used as a charge transporting layer preferably comprises an electrolyte, a solvent, and additives. The electrolyte includes combinations of $I_2$ and an iodide (for example, a metal iodide, such as LiI, NaI, KI, CsI or $CaI_2$, and an iodine salt of a quaternary ammonium compound, such as a tetraalkylammonium iodide, pyridinium iodide and imidazolium iodide); combinations of $Br_2$ and a bromide (for example, a metal bromide, such as LiBr, NaBr, KBr, CsBr or $CaBr_2$, and a bromine salt of a quaternary ammonium compound, such as a tetraalkylammonium bromide or pyridinium bromide); metal complexes, such as a ferrocyananate-ferricyanate system or a ferrocene-ferricinium ion system; sulfur compounds, such as poly(sodium sulfite) and an alkylthiolalkyl disulfide; viologen dyes; hydroquinone-quinone; and the like. Preferred of them are combinations of $I_2$ and an iodine salt of a quaternary ammonium compound, such as pyridinium iodide or imidazolium iodide. These electrolytes can be used either individually or as a mixture thereof.

A suitable electrolyte concentration is 0.1 to 15 M, preferably 0.2 to 10 M. Where iodine is added to the electrolyte, a preferred iodine concentration is 0.01 to 0.5 M.

It is preferred for the solvent dissolving the electrolyte to have a low viscosity and a high dielectric constant thereby to manifest excellent ion conductivity. To have a low viscosity leads to an improvement in ion mobility. To have a high dielectric constant brings about an increase in effective carrier concentration. Solvents suitable from this viewpoint include carbonate compounds, such as ethylene carbonate and propylene carbonate; heterocyclic compounds, such as 3-methyl-2-oxazolidinone; ether compounds, such as dioxane and diethyl ether; acyclic ethers, such as ethylene glycol dialkyl ethers, propylene glycol dialkyl ethers, polyethylene glycol dialkyl ethers, and polypropylene glycol dialkyl ethers; alcohols, such as methanol, ethanol, ethylene glycol monoalkyl ethers, propylene glycol monoalkyl ethers, polyethylene glycol monoalkyl ethers, and polypropylene glycol monoalkyl ethers; polyhydric alcohols, such as ethylene glycol, propylene glycol, polyethylene glycol, polypropylene glycol, and glycerol; nitrile compounds, such as acetonitrile, glutaronitrile, methoxyacetonitrile, propionitrile, and benzonitrile; aprotic polar solvents, such as dimethyl sulfoxide and sulfolane; and water.

The electrolyte composition can contain a basic compound, such as t-butylpyridine, 2-picoline, and 2,6-lutidine, as disclosed in *J. Am. Ceram. Soc.*, vol. 80, No. 12, pp. 3157–3171 (1997). A preferred concentration of the basic compound is 0.05 to 2 M.

A liquid electrolyte can be solidified to gel by addition of a polymer, addition of an oil gelling agent, polymerization of a polyfunctional monomer, crosslinking of a polymer, or a like technique. Polymers which can be added to cause the electrolyte to gel include the compounds described in J. R. MacCallum and C. A. Vincent, Elsevier *Applied Science*, "Polymer Electrolyte Reviews-1 and 2". Polyacrylonitrile and polyvinylidene fluoride are particularly preferred.

Oil gelling agents include the compounds disclosed in *J. Chem. Soc.* Japan, *Ind. Chem. Sec.*, vol. 46, p. 779 (1943), *J. Am. Chem. Soc.*, vol. 111, p. 5542 (1989), *J. Chem. Soc., Chem. Commun.*, p. 390 (1993), *Angew. Chem. Int. Ed. Engl.*, vol. 35, p. 1949 (1996), *Chem. Lett.*, p. 885 (1996), and *J. Chem. Soc., Chem. Commun.*, p. 545 (1997). Preferred of them are those having an amide structure in the molecule.

Where a gel electrolyte is prepared by polymerization of a polyfunctional monomer, a preferred process comprises applying a solution comprising a polyfunctional monomer, a polymerization initiator, an electrolyte, and a solvent to a dye-sensitized electrode by casting, coating, dipping, impregnation or a like technique to form a sol electrolyte layer, followed by radical polymerization to make the sol into gel. Preferred polyfunctional monomers are those having two or more ethylenically unsaturated groups per molecule, such as divinylbenzene, ethylene glycol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, pentaerythritol triacrylate, and trimethylolpropane triacrylate. The polyfunctional monomer can be used in combination with a monofunctional monomer. Preferred monofunctional monomers to be combined include esters or amides derived from acrylic acid or α-alkylacrylic acids (e.g., methacrylic acid), such as N-isopropylacrylamide, acrylamide, 2-acrylamide-2-methylpropanesulfonic acid, acrylamidopropyltrimethylammonium chloride, methyl acrylate, hydroxyethyl acrylate, n-propyl acrylate, n-butyl acrylate, 2-methoxyethyl acrylate, and cyclohexyl acrylate; vinyl esters, such as vinyl acetate; esters derived from maleic acid or fumaric acid, such as dimethyl maleate, dibutyl maleate, and diethyl fumarate; a sodium salt of maleic acid, fumaric acid or p-styrenesulfonic acid; acrylonitrile, methacrylonitrile; dienes, such as butadiene, cyclopentadiene and isoprene; aromatic vinyl compounds, such as styrene, p-chlorostyrene, and sodium styrenesulfonate; vinyl compounds having a nitrogen-containing heterocyclic ring, vinyl compounds having a quaternary ammonium salt, N-vinylformamide, N-vinyl-N-methylformamide, vinylsulfonic acid, sodium vinylsulfonate, vinylidene fluoride, vinylidene chloride; vinyl alkyl ethers, such as methyl vinyl ether; ethylene, propylene, 1-butene, isobutene, N-phenylmaleimide, and the like. The polyfunctional monomer is preferably used in a proportion of 0.5 to 70%, particularly 1.0 to 50%, by weight based on the total monomer mixture.

The monomers can be polymerized through radical polymerization generally followed for polymer synthesis in accordance with the processes described in Takayuki Ohtsu & Masaetsu Kinoshita, Kobunshi goseino jikkenho, Kagaku Dojin, and Takayuki Ohtsu, Koza jugohan-no ron I radical jugo (I), Kagaku Dojin. While the monomers for gel electrolytes used in the invention are radical polymerizable by heat, light or electron beams or electrochemically, heat-induced radical polymerization is convenient. Polymerization initiators which are preferably used in heat-induced radical polymerization include azo initiators, such as 2,2'-azobisisobutyronitrile, 2,2'-azobis(2,4-dimethylvaleronitrile), and dimethyl 2,2'-azobis(2-methylpropionate); and peroxide initiators, such as benzoyl peroxide. The polymerization initiator is preferably used in an amount of 0.01 to 20%, particularly 0.1 to 10%, by weight based on the total monomer mixture. The proportion of the monomers in the gel electrolyte is preferably 0.5 to 70%, particularly 1.0 to 50%, by weight.

Where an electrolyte is made into gel by crosslinking of a polymer, it is desirable to use a combination of a polymer having a crosslinkable group and a crosslinking agent. Preferred crosslinkable groups include a nitrogen-containing heterocyclic group, e.g., a pyridine ring, an imidazole ring, a thiazole ring, an oxazole ring, a triazole ring, a morpholine ring, a piperidine ring or a piperazine ring. Preferred crosslinking agents include reagents having bi- or higher-functionality in electrophilic reaction with a nitrogen atom, such as alkyl halides, aralkyl halides, sulfonic esters, acid anhydrides, acid chlorides, and isocyanates.

In the present invention, an organic and/or an inorganic hole-transporting material can be used in place of the electrolyte. Useful organic hole-transporting materials include aromatic amines, such as N,N'-diphenyl-N,N'-bis(4-methoxyphenyl)-(1,1$^1$-biphenyl)-4,4'-diamine (see J. Hagen et al., Synthetic Metal, vol. 89, pp. 215–220 (1997)), 2,2', 7,7I-tetrakis(N,N-di-p-methoxyphenylamine)-9,9'-spirobifluorene (see Nature, vol. 395, pp. 583–585 (Oct. 8, 1998) and WO97/10617), aromatic diamine compounds having tertiary aromatic amine units linked, such as 1,1-bis{4-(di-p-tolylamino)phenyl}cyclohexane (see JP-A-59-194393), aromatic amine compounds having two or more tertiary amino groups with two or more condensed aromatic rings each bonded to the nitrogen atom of the tertiary amino group, typically exemplified by 4,4'-bis[(N-1-naphthyl)-N-phenylamino]biphenyl (see JP-A-5-234681), aromatic triamines derived from triphenylbenzene and having a star-burst structure (see U.S. Pat. Nos. 4,923,774 and JP-A-4-308688), aromatic diamines, such as N,N'-diphenyl-N,N'-bis(3-methylphenyl)-(1,1'-biphenyl) -4,4 1-diamine (see U.S. Pat. No. 4,764,625), α, α,α',α'-tetramethyl-α,α'-bis(4-di-p-tolylaminophenyl)-p-xylene (see JP-A-3-269084), p-phenylenediamine derivatives, triphenylamine derivatives which are sterically asymmetric as a whole molecule (see JP-A-4-129271), compounds having a plurality of aromatic diamino groups on a pyrenyl group (see JP-A-4-175395), aromatic diamines having aromatic tertiary amine units linked together via an ethylene group (see JP-A-4-264189), aromatic diamines having a styryl structure (see JP-A-4-290851), benzylphenyl compounds (see JP-A-4-364153), compounds having tertiary amines linked together via a fluorene group (see JP-A-5-25473), triamine compounds (see JP-A-5-239455), bisdipyridylaminobiphenyl (see JP-A-5-320634), N,N,N-triphenylamine derivatives (see JP-A-6-1972), aromatic diamines having a phenoxazine structure (JP-A-7-138562), and diaminophenylphenanthridine derivatives (JP-A-7-252474); thiophene derivatives or oligomeric thiophene derivatives, such as α-octylthiophene, α,ω-dihexyl-α-octylthiophene (see Adv. Mater., vol. 9, No. 7, p. 557 (1997)), hexadodecyldodecithiophene (see Angew. Chem. Int. Ed. Engl., vol. 34, No. 3, pp. 303–307 (1995)), and 2,8-dihexylanthra[2,3-b:6,7-b']dithiophene (see JACS, vol. 120, No. 4, pp. 664–672 (1998)); and electrically conductive polymers, such as polypyrrole compounds (see K. Murakoshi et al., Chem. Lett., p. 471 (1997)) and poly-acetylene and derivatives thereof, poly(p-phenylene) and derivatives thereof, poly(p-phenylenevinylene) and derivatives thereof, polythienylenevinylene and derivatives thereof, polythiophene and derivatives thereof, polyaniline and derivatives thereof, and polytoluidine and derivatives thereof (see Nalwa, Handbook of Organic Conductive Molecules and Polymers, vols. 1, 2, 3 and 4, Wiley) . As taught in Nature, vol. 395, pp. 583–585 (Oct. 8, 1998), a compound containing a cationic radical, such as tris(4-bromophenyl) aluminum hexachloroantimonate, can be added to the organic hole-transporting material so as to control the dopant level, or a salt such as Li[(CF$_3$SO$_2$)$_2$N] can be added to control the potential on the oxide semiconductor surface (i.e., compensation of a space charge layer).

The organic hole-transporting material can be introduced into the inside of the electrode by vacuum evaporation, casting, coating, spin coating, dipping, electrolytic polymerization, photoelectrolytic polymerization, and the like. Where the hole-transporting material is used in place of an electrolytic solution, it is preferred to provide a titanium dioxide thin layer as an undercoat for preventing a shot circuit by, for example, spray pyrolysis as described in Electrochim. Acta, vol. 40, pp. 643–652 (1995).

Where an inorganic solid compound is used in place of an electrolyte, copper iodide (p-CuI) (see J. Phys. D:Appl Phys., vol. 31, pp. 1492–1496 (1998)), copper thiocyanide (see Thin Solid Films, vol. 261, pp. 307–310 (1995), J. Appl. Phys., vol. 80, No. 8, pp. 4749–4754 (Oct. 15, 1996), Chem. Mater., vol. 10, pp. 1501–1509 (1998), and Semicond. Sci. Technol., vol. 10, pp. 1689–1693), etc. is introduced into the inside of the electrode by means of casting, coating, spin coating, dipping, electrolytic plating, and the like.

There are two conceivable methods of forming a charge transporting layer. One comprises adhering a counter electrode to the dye-sensitized semiconductor layer and penetrating a liquid charge transporting material into the gap therebetween. The other comprises forming a charge transporting layer on the dye-sensitized semiconductor layer and then providing a counter electrode thereon. The former method can be effected by an ambient pressure process which makes use of capillarity by, for example, soaking or a vacuum process in which a gas phase is displaced with a liquid phase under reduced pressure.

The latter method embraces various embodiments. Where the charge transporting layer is of a wet system, a counter electrode is provided thereon while the layer is wet, and the edges call for a leakproof measure. In the case of a gel electrolyte, a wet electrolyte as applied may be solidified by, for example, polymerization. In this case, the solidified gel electrolyte can be dried and fixed before a counter electrode is provided. A wet organic hole-transporting material or a gel electrolyte as well as an electrolytic solution can be applied in the same manner as for the formation of the particulate semiconductor-containing layer or for dye adsorption, i.e., immersion, roll coating, dip coating, air knife coating, extrusion coating, slide hopper coating, wire bar coating, spin coating, spraying, casting, and various printing methods. A solid electrolyte or a solid hole-transporting material can be applied by dry film forming-techniques, such as vacuum evaporation or CVD.

Considering adaptability to large-scale production, an electrolytic solution or a wet hole-transporting material that cannot be solidified can be treated by sealing the edges immediately after application. In the case of a hole-transporting material that can be solidified, it is preferred for scaling-up that the film formed in a wet system be solidified by photopolymerization or heat-induced radical polymerization, etc. before a counter electrode is provided thereon. In this manner, the method of forming a charge transporting layer can be chosen appropriately according to the liquid physical properties or processing conditions.

The water content of the charge transporting layer is preferably 10,000 ppm or less, still preferably 2,000 ppm or less, particularly preferably 100 ppm or less.

In a photoelectric cell using the photoelectric conversion device, the counter electrode functions as a positive electrode. The counter electrode usually has a substrate having a conductive layer, such as the one used for the semiconductor electrode (work electrode), but the substrate is not always required as far as sufficient strength or tight seal is secured. Conductive materials of choice for the counter electrode include metals (e.g., platinum, gold, silver, copper,- aluminum, rhodium, and indium), carbon, and conductive metal oxides (e.g., indium-tin complex oxide and fluorine-doped tin oxide). Suitable counter electrodes include glass or plastic substrates having a metal or a conductive oxide deposited thereon, and thin metal films.

While not limiting, the counter electrode preferably has a thickness of 3 nm to 10 $\mu$m. In particular, a metallic counter electrode preferably has a thickness of 5 $\mu$m or smaller, particularly 5 nm to 3 $\mu$m.

At least one of the conductive substrate of the work electrode and the counter electrode must be substantially transparent so that incident light can reach the photosensitive layer. It is preferred for the photoelectric cell of the invention that the conductive substrate of the work electrode be transparent so that light may be incident upon this side. In this case, it is a preferred embodiment that the counter electrode has light reflecting properties.

As mentioned with respect to formation of the charge transporting layer, the counter electrode is provided either on the charge transporting layer or directly on the particulate semiconductor-containing layer. In either case, the counter electrode can be provided by coating, laminating, vacuum evaporation, press bonding, or the like method as selected appropriately according to the kind of the counter electrode or the kind of the charge transporting layer. For example, a substrate having a conductive layer of the above-described conductive material formed by coating, vacuum evaporation or CVD can be stuck on the charge transporting layer or the particulate semiconductor-containing layer. Where the charge transporting layer is solid, the above-described conductive material is applied thereon by coating, plating, PVD, CVD, or a like technique.

If necessary, additional functional layers, such as a protective layer and an antireflection layer, can be formed on the conductive support of the work electrode and/or the counter electrode. Where a plurality of additional layers having the respective functions are to be provided, while they can be formed either simultaneously or successively, simultaneous coating is preferred for productivity. Simultaneous coating is conveniently carried out by a slide hopper method or extrusion coating in view of productivity and uniformity of the film formed. Depending on the material, these functional layers may be provided by vacuum evaporation or press bonding.

The photoelectric cell of the invention preferably has its sides sealed with a polymer, an adhesive, etc. to prevent deterioration by oxidation or volatilization of the volatile matter contained therein.

Figure 2:
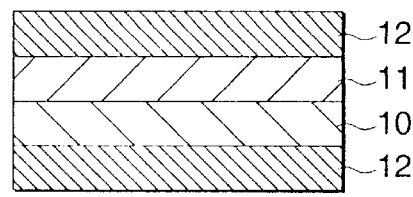
FIGS. 2(a) to 2(d) and 3(e) to 3(h) show basic structures of photoelectric cells.
Figure 2:
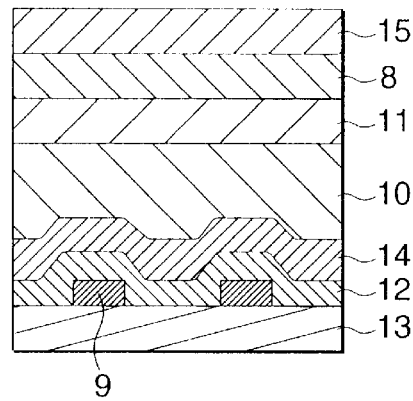
Figure 2:
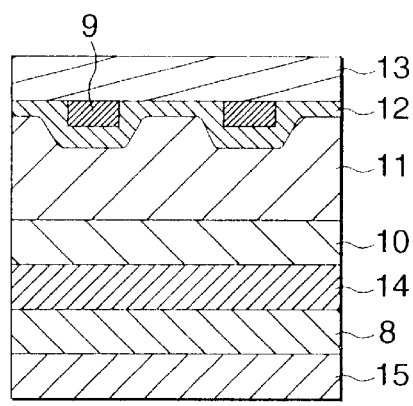
Figure 2:
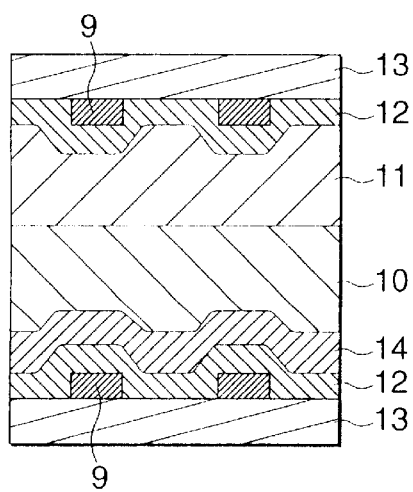
Figure 3:
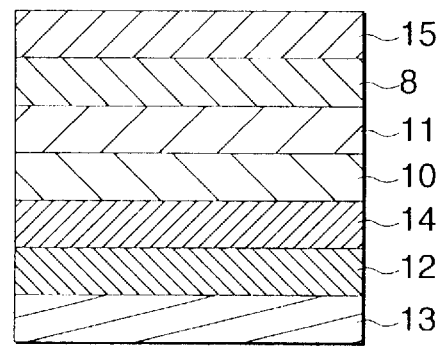
Figure 3:
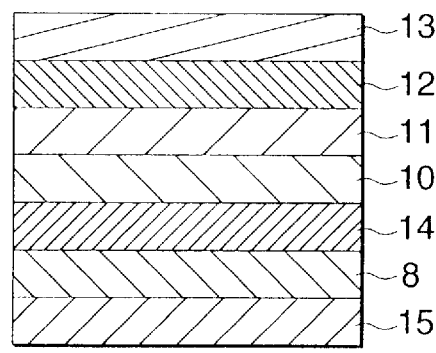
Figure 3:
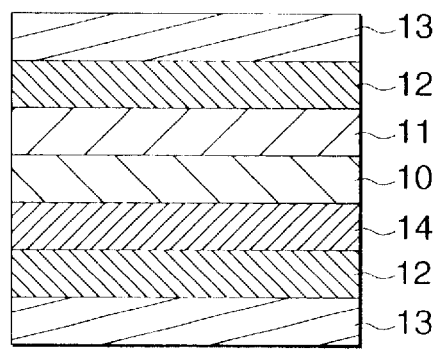
Figure 3:
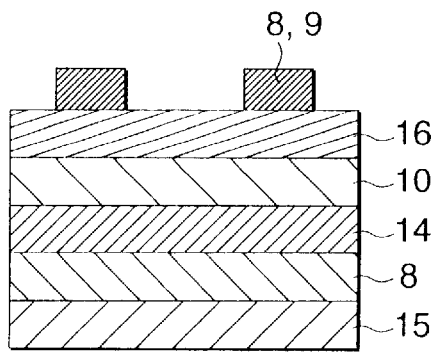

The cell structure and-the module structure of the photoelectric cell, especially a dye-sensitized solar cell, to which the photoelectric conversion device of the invention is applied are then described. While a dye-sensitized solar cell basically has the same structure as the above-described photoelectric conversion device and photoelectric cell, a variety of forms can be taken in conformity with the end use as shown in FIGS. 2 and 3. Conceivable forms are roughly divided into two types; structures which receive light from both sides (FIGS. 2(*a*), 2(*d*) and 3(*g*)) and those which receive light from one side (FIGS. 2(*b*), 2(*c*), 3(*e*), 3(*f*), and 3(*h*)).

FIG. 2(*a*) is a structure made up of a pair of transparent conductive layers 12 having sandwiched therebetween a dye-sensitized TiO$_2$ layer 10 (semiconductor-containing layer), and a charge transporting layer 11. FIG. 2(*b*) is a structure having, in the order described, a transparent substrate 13, a metal lead 9 (partially provided), a transparent conductive layer 12, an undercoat 14, a dye-sensitized TiO$_2$ layer 10, a charge transporting layer 11, a metal layer 8, and a supporting substrate 15. FIG. 2(*c*) shows a structure having, in the order described, a supporting substrate 15, a metal layer 8, an undercoat 14, a dye-sensitized TiO$_2$ layer 10, a charge transporting layer 11, a transparent conductive layer 12, and a transparent substrate 13 partially having thereon a metal lead 9 with the metal lead side thereof inside. FIG. 2(*d*) is a structure made up of a pair of transparent substrates 13 each having a metal lead 9 (partially provided) and a transparent conductive layer 12 with the transparent conductive layer 12 inside, having sandwiched therebetween an undercoat 14, a dye-sensitized TiO$_2$ layer 10, and a charge transporting layer 11. FIG. 3(*e*) depicts a structure having, in the order described, a transparent substrate 13, a transparent conductive layer 12, an undercoat 14, a dye-sensitized TiO$_2$ layer 10, a charge transporting layer 11, a metal layer 8, and a supporting substrate 15. FIG. 3(*f*) illustrates a structure having, in the order described, a supporting substrate 15, a metal layer 8, an undercoat 14, a dye-sensitized TiO$_2$ layer 10, a charge transporting layer 11, a transparent conductive layer 12, and a transparent substrate 13. FIG. 3(*g*) shows a structure composed of a pair of transparent substrates 13 each having on the inner side thereof a transparent conductive layer 12, having sandwiched therebetween an undercoat 14, a dye-sensitized TiO$_2$ layer 10, and a charge transporting layer 11. FIG. 3(*h*) is a structure having, in the order described, a supporting substrate 15, a metal layer 8, an undercoat 14, a dye-sensitized TiO$_2$ layer, and a solid charge transporting layer 16, on which a metal layer 8 or a metal lead 9 is provided in parts.

The module of the dye-sensitized solar cell basically has the same structure-as conventional solar cell modules. It generally comprises cells built up on a metallic, ceramic or like supporting substrate and covered with a filling resin or protective glass so that light can enter on the side opposite to the supporting substrate. Where the supporting substrate, on which the cells are provided, is made of a transparent material such as tempered glass, the cells can take in light from the side of the transparent supporting substrate. The module structure includes a superstraight type, a substraight type or potting type or a substrate-integrated type used in amorphous silicon solar cells. A suitable module structure can be chosen appropriately according to the end use or the place of use, i.e., the environment in which it is to be used.

Figure 4:
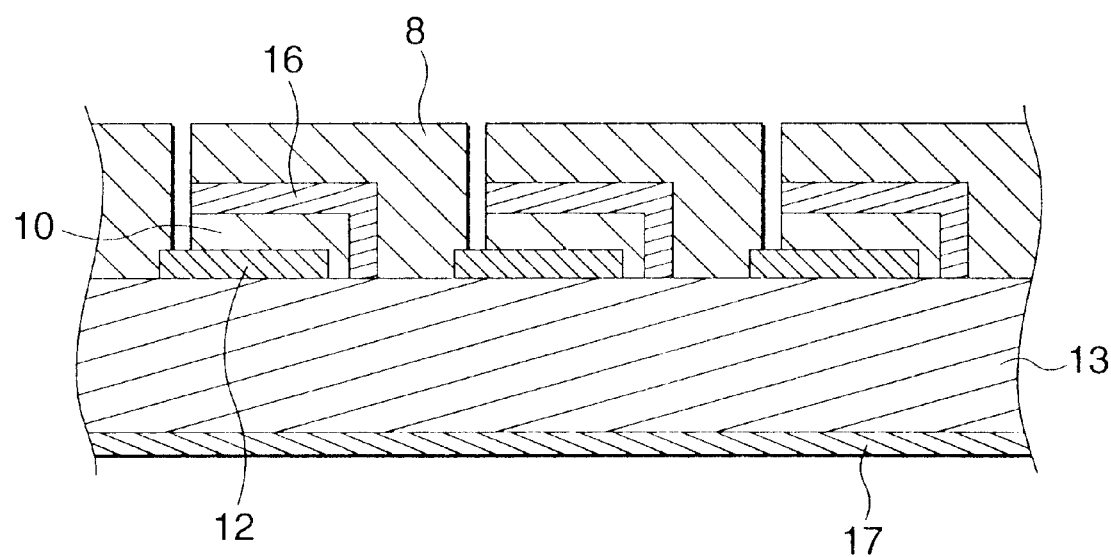
FIG. 4 shows an example of a substrate-integrated type module.

FIG. 4 presents an example of a substrate-integrated type module of the device according to the invention. The module structure shown in FIG. 4 comprises cells formed on a transparent substrate 13 which has on one side thereof a transparent conductive layer 12, a dye-sensitized $TiO_2$ layer 10, a solid charge transporting layer 16, and a metal layer 8 and, on the other side, an antireflection layer 17. It is preferred to increase the area ratio (the ratio of the area seen from the transparent substrate 13, the light incident side) of the dye-sensitized $TiO_2$ layer 10, which is a photosensitive area, to increase the utilization efficiency of incident light.

A superstraight or substraight type module typically comprises a pair of supporting substrates one or both of which are transparent and have been subjected to an antireflection surface treatment, having cells interposed therebetween at regular intervals, the cells being connected to each other with a metal lead, flexible wiring, etc. A current collecting electrode is disposed at the outer edge to take out the generated power. In order to protect the cells and to increase the current collection efficiency, various plastic materials, such as ethylene-vinyl acetate copolymer (EVA), selected according to the purpose can be provided between the substrates and the cells in the form of a film or a filling resin. Where the module is for use in places free from shocks so that there is no need to cover the surface with a rigid material, the surface protective layer may be of a transparent plastic film, or the above-mentioned filling and/or a sealing material is hardened to serve as a protector which can take the place of the substrate on that side. To secure tight seal of the inside and rigidity of the module, the peripheries of the supporting substrates are fixed in a metal frame, and the gap between the substrates and the frame is sealed with a sealing compound.

A solar cell could be constituted even on a curved surface by using flexible materials for the cells themselves, substrates, filling materials and sealing compounds. Thus, solar cells having various forms or functions can be produced in conformity with the end use or the environment of use.

On an industrial scale, solar cell modules of superstraight type are manufactured by, for example, successively providing a front substrate, fed from a substrate feeder and carried on a belt conveyer, etc., with cells together with a sealing compound, leads for cell connection, back side sealing compound, and the like, putting thereon a back substrate or a back cover, and setting a frame around the peripheries. Those of substraight type are manufactured by, for example, successively providing a supporting substrate, fed from a substrate feeder and carried on a belt conveyer, etc., with cells together with leads for cell connection, a sealing compound, and the like, putting a front cover thereon, and setting a frame around the peripheries.

Modules of substrate-integrated type shown in FIG. 4 are produced by successively providing a supporting substrate with a transparent electrode layer, a photosensitive layer, a charge transporting layer, a back electrode layer, etc. to build-up three-dimensional structures at given intervals by known semiconductor processing techniques, such as selective plating, selective etching, CVD and PVD, or by pattern coating, or by mechanical processing techniques involving the step of forming a layer by coating in a band form, followed by patterning by laser machining, plasma CVM (see *Solar Energy Materials and Solar Cells*, vol. 48, pp. 373–381) or a mechanical means, such as grinding.

The sealing compound to be used in the module manufacture is selected from various materials, for example liquid EVA, a mixture of vinylidene fluoride copolymer and an acrylic resin, and an EVA film, in accordance with the purposes, such as improvement on weatherability, electrical insulation, improvement on light collection efficiency, protection of cells (improvement on impact resistance), and the like. The sealing compound is applied on the cells by an appropriate method fit for the physical properties of the compound. For example, a sealing material of film form is applied onto the cells by pressing with a roller or vacuum packaging, followed by heat sealing. A liquid or pasty sealing compound can be applied by roll coating, bar coating, spraying, screen printing, or a like method. A transparent filler may be added to the sealing compound to enhance the strength or to increase light transmission. Weatherable and moistureproof resins are convenient for sealing the gap between the periphery of the module and the frame.

Where a flexible supporting substrate of PET, PEN, etc. is used, a highly productive production process is constituted by unrolling the substrate from a rollstock, building up cells thereon, and applying a sealing layer continuously in the manner described above.

In order to increase power generation efficiency of the module, the light-receiving side of the substrate (generally tempered glass) is subjected to an antireflection surface treatment, such as laminating or coating with an antireflection coat. Further, incident light utilization efficiency can be increased by grooving or texturing the cell surface. It is important for obtaining increased power generation efficiency not only that light be took in the inside of the module with little loss but that the light having passed through the photosensitive layer and reached the opposite substrate be reflected and returned to the photosensitive layer. This is achieved by a method comprising mirror polishing the surface of the back substrate and applying Ag, Al, etc. by vacuum evaporation or plating, a method comprising providing the back side of the cell with an alloy layer of Al—Mg, Al—Ti, etc. as a reflecting layer, or a method comprising annealing to have the back side textured.

It is also important for increasing the power generation efficiency to minimize the resistance of intercellular connections thereby to suppress internal voltage drop. The cells are usually connected by wire bonding or with a conductive flexible sheet. In addition, a conductive adhesive tape or a conductive adhesive can be used for achieving both cells fixing and electrical connection among the cells, or a conductive hot-melt adhesive can be patternwise applied to desired sites.

Solar cells using a flexible substrate such as a polymer film are produced by successively forming cells on the substrate, being unrolled and transferred, in the manner described above, cutting to size, and sealing the periphery with a flexible and moistureproof material. A module structure called "SCAF" (see *Solar Energy Materials and Solar Cells*, vol. 48, pp. 383–391) is also applicable. Solar cells having a flexible substrate can be used as adhered to curved glass.

The present invention will now be illustrated in greater detail with reference to the following Examples, but the invention should not be construed as being limited thereto. Unless otherwise noted, all the percents are by weight.

EXAMPLE 1

1) Preparation of Titanium dioxide-containing Coating Compositions

A titanium dioxide dispersion having a concentration of 8% was prepared in accordance-with the method using nitric acid which is reported in Barbe, et al, *J. Am. Ceram. Soc.*, vol. 80, No. 12 p. 3157 (1997), except that the autoclaving was conducted at 250° C. for 16 hours. The average particle size of the dispersed titanium dioxide particles was about 15 nm as obtained from the X-ray diffraction line width of (101) reflection. The coefficient of variation in particle size was 43%. To the dispersion was added polyethylene glycol (molecular weight: 500,000, available from Wako Pure Chemical Ind., Ltd.) in an amount of 30% based on the titanium dioxide to prepare a comparative coating composition (designated "coating composition 1").

Titanium dioxide-containing coating compositions of the invention were prepared as follows.

The method described in *J. Colloid Interface Sci.*, vol. 193, pp. 140–141 (1977) was followed, except that ammonia was not used, and nitric acid was added in a concentration of 0.1 M. Water and isopropyl alcohol were used as a hydrophilic solvent as taught in the reference. The system was aged at 100° C. for 24 hours to form titanium hydroxide and then further aged at 140° C. for 72 hours to obtain a 2% titanium dioxide dispersion having an average particle size of 15 nm. The coefficient of variation was 26%. The system was centrifuged, and the supernatant liquid was discarded to increase the titanium dioxide concentration to 8%. To the dispersion was added the same polyethylene glycol as used above in an amount of 30% based on the titanium dioxide to prepare a coating composition (designated "coating composition 2").

Coating composition 3 was prepared in the same manner as for coating composition 2, except that nitric acid was added to a concentration of 0.35 M. The dispersed $TiO_2$ particles had an average particle size of 12 nm with a coefficient of variation of 29%.

Coating composition 4 was prepared in the same manner as for coating composition 2, except for adding no nitric acid. The dispersed $TiO_2$ had an average particle size of 18 nm with a coefficient of variation of 23%.

Coating composition 5 was prepared in the same manner as for coating composition 2, except that acetic acid was added to a concentration of 0.25 M in place of nitric acid. The dispersed $TiO_2$ particles had an average particle size of 15 nm with a coefficient of variation of 18%.

In the above-described preparation of $TiO_2$ dispersions, the system containing nitric acid or acetic acid turned into white gel by the end of the 100° C. aging, while the system containing neither nitric acid nor acetic acid (the system for preparing coating composition 4) became a gel precursor in the 100° C. aging.

2) Preparation of dye-sensitized $TiO_2$ Electrode

Each of the coating compositions prepared in (1) above was applied to the conductive side of electrically conductive transparent glass having an fluorine-doped tin oxide coat (available from Nippon Sheet Glass Co., Ltd.; surface resistance: about 10 Ω/square) with a doctor blade to a thickness of 100 μm. After drying at 25° C. for 30 minutes, the coated glass substrate was baked in an electric muffle furnace (Model FP-32, manufactured by Yamato Kagaku) at 450° C. for 30 minutes and cooled out of the furnace. The coating weight and thickness of the titanium dioxide layer were 9 $g/m^2$ and 6 μm, respectively.

The coated glass substrate was immersed in an ethanolic solution of $3 \times 10^{-4}$ mol/l of dye R-1 at 60° C. for 2 hours. The dyed glass substrate was washed with acetonitrile and dried spontaneously in a dark place. The amount of the dye adsorbed was in the range of from about 0.7 to $1.1 \times 10^{-3}$ mol per $m^2$ of the $TiO_2$ layer.

3) Preparation of Photoelectric Cell

As shown in FIG. 1, the resulting dye-sensitized $TiO_2$ electrode substrate (2 cm×2 cm) and a Pt-deposited glass substrate of the same size were brought into contact with the electrode layer 3 and the Pt deposit layer 6 facing each other. A molten salt electrolyte consisting of 0.02 g of iodine, 0.7 g of Y8-1, and 0.3 g of Y7-2 was introduced into the gap between the two glass substrates by making use of capillarity so as to penetrate into the $TiO_2$ electrode. The resulting photoelectric cells (designated C1 to C5) were each composed of, in sequence, a conductive support (glass 1 with a transparent conductive layer 2), a $TiO_2$ electrode layer 3, a dye layer 4, an electrolyte layer 5, a Pt layer 6, and glass 7.

4) Measurement of Photoelectric Conversion Efficiency

The conductive glass and the Pt-deposited glass were connected by means of alligator clips, and the cell was irradiated with pseudo-sunlight having an intensity of 100 $mW/cm^2$ which was created by cutting light from a 500 W xenon lamp (produced by Ushio Inc.) through a spectral filter (AM1.5 Filter available from Oriel) . The generated electricity was recorded with a Keithley electrometer (Model SMU238) at a constant temperature of 40° C. to obtain an open circuit voltage ($V_{oc}$), a short circuit current density ($J_{sc}$), a fill factor (FF), and a conversion efficiency (η). The results obtained are shown in Table 1 below.

TABLE 1

| Cell No. | $V_{OC}$ (V) | $J_{SC}$ ($mA/cm^2$) | FF | η (%) |
| --- | --- | --- | --- | --- |
| C1 (comparison) | 0.59 | 7.62 | 0.61 | 2.7 |
| C2 | 0.61 | 10.31 | 0.62 | 3.9 |
| C3 | 0.61 | 9.10 | 0.63 | 3.5 |
| C4 | 0.61 | 9.62 | 0.63 | 3.7 |
| C5 | 0.61 | 10.92 | 0.63 | 4.2 |

It is seen from Table 1 that the photoelectric materials comprising the monodisperse titanium dioxide particles obtained by the process of the invention have a high short circuit current and a high photoelectric conversion efficiency. Inter alia, titanium dioxide particles formed by using acetic acid exhibits excellent monodisperse properties, a high short circuit current, and a high conversion efficiency.

According to the present invention, a dye-sensitized photoelectric conversion device and a photoelectric cell having a high short circuit current and an excellent conversion efficiency are provided.

While the invention has been described in detail and with reference to specific examples thereof, it will be apparent to one skilled in the art that various changes and modifications can be made therein without departing from the spirit and scope thereof.

What is claimed is:

1. A photoelectric conversion device having a photosensitive layer comprising semiconductor particles obtained from a metal hydroxide gel or a precursor thereof present in a hydrophilic solvent.

2. The photoelectric conversion device according to claim 1, wherein said metal hydroxide gel or said precursor is formed by hydrolysis of a stable metal complex.

3. The photoelectric conversion device according to claim 2, wherein said metal complex has a ligand selected from the group consisting of compounds having a hydroxyl group, a carbonyl group, an ester group or a carboxyl group and amine compounds.

4. The photoelectric conversion device according to claim 2, wherein said metal complex has a multidentate ligand.

5. The photoelectric conversion device according to claim 1, wherein said semiconductor is a metal chalcogenide.

6. The photoelectric conversion device according to claim 1, wherein said semiconductor comprises at least one chalcogenide compound of a metal selected from the group consisting of titanium, tin, zinc, iron, tungsten, zirconium, hafnium, strontium, indium, cerium, yttrium, lanthanum, vanadium, niobium and tantalum.

7. The photoelectric conversion device according to claim 1, wherein said semiconductor is a metal oxide.

8. The photoelectric conversion device according to claim 1, wherein said semiconductor is titanium dioxide.

9. The photoelectric conversion device according to claim 1, wherein said semiconductor particles have a coefficient of particle size variation of 30% or less.

10. The photoelectric conversion device according to claim 1, wherein said semiconductor particles have a coefficient of particle size variation of 20% or less.

11. The photoelectric conversion device according to claim 1, wherein said semiconductor particles are sensitized with a dye.

12. The photoelectric conversion device according to claim 11, wherein the dye is at least one of a ruthenium complex dye and a methine dye.

13. The photoelectric conversion device according to claim 1, further having a charge transporting layer comprising a molten salt electrolyte.

14. The photoelectric conversion device according to claim 1, further having a charge transporting layer comprising a hole-transporting material.

15. A photoelectric cell-comprising a photoelectric conversion device according to any one of claims 1 to 14.

* * * * *